(12) United States Patent
Shibamiya et al.

(10) Patent No.: US 7,394,450 B2
(45) Date of Patent: Jul. 1, 2008

(54) DISPLAY CONTROL DEVICE AND METHOD, AND DISPLAY SYSTEM

(75) Inventors: Yoshikazu Shibamiya, Tokyo (JP); Shigeki Mori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 10/812,877

(22) Filed: Mar. 31, 2004

(65) Prior Publication Data

US 2004/0257337 A1    Dec. 23, 2004

(30) Foreign Application Priority Data

Apr. 4, 2003   (JP)   ............... 2003-101655
Mar. 30, 2004  (JP)   ............... 2004-099140

(51) Int. Cl.
*G09G 5/00* (2006.01)
(52) U.S. Cl. ............... 345/156; 345/1; 345/179; 345/180
(58) Field of Classification Search ............... 345/156, 345/1, 179, 180
See application file for complete search history.

(56) References Cited

U.S. PATENT DOCUMENTS

| | | | |
|---|---|---|---|
| 5,926,174 A | 7/1999 | Shibamiya et al. | 345/213 |
| 6,215,467 B1 | 4/2001 | Suga et al. | 345/132 |
| 6,310,662 B1 | 10/2001 | Sunakawa et al. | 348/747 |
| 2001/0006382 A1* | 7/2001 | Sevat | 345/169 |

FOREIGN PATENT DOCUMENTS

JP   2001-94900   4/2001

* cited by examiner

*Primary Examiner*—Richard Hjerpe
*Assistant Examiner*—Leonid Shapiro
(74) *Attorney, Agent, or Firm*—Fitzpatrick, Cella, Harper & Scinto

(57) ABSTRACT

A display control device executes different types of control according to a case wherein a screen region has been set with a display device and a case wherein a screen region has not been set with the display device using a predetermined command. Also, a configuration is provided wherein control information does not overlap a predetermined screen region.

11 Claims, 26 Drawing Sheets

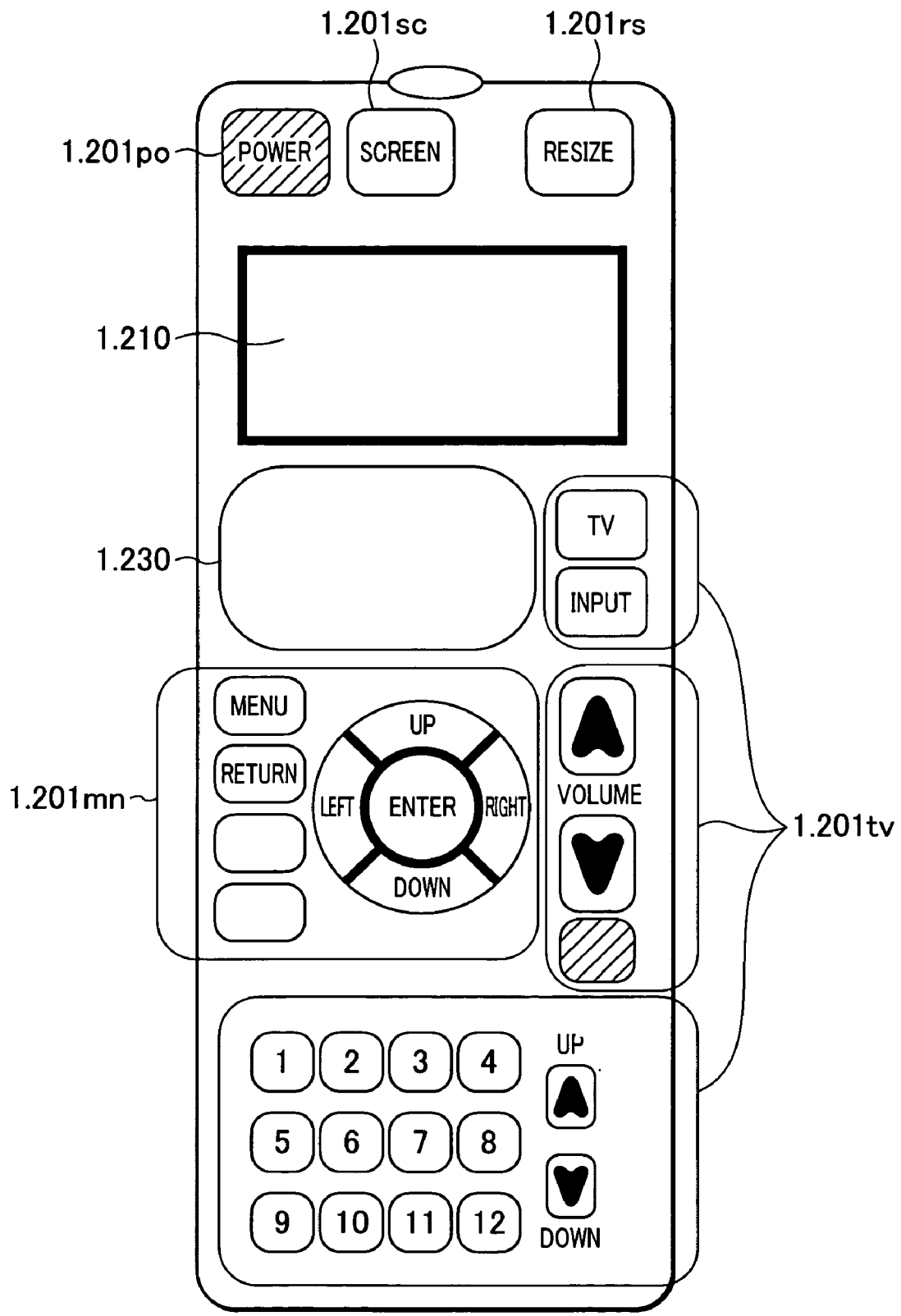

FIG. 5

RDC TABLE FOR VIEWERS A AND B INDIVIDUALLY VIEWING

| | | REGION 1 | REGION 2 | |
|---|---|---|---|---|
| REMOTE CONTROL ID | | ID1 | ID2 | ... |
| OPERATING REGISTER | | VIEWING, MENU | VIEWING | |
| PRIORITY | | 1 | 2 | |
| DISTANCE | | L1 | L2 | |
| DISPLAY REGION | | (xs1,ys1) (xe1,ye1) | (xs2,ys2) (xe2,ye2) | |
| SCREEN MODE | | LARGE/SMALL | SINGLE | |
| DISPLAY SCREEN INFORMATION 1 | IMAGE ID | ID1 · MAIN | ID2 · MAIN | |
| | DISPLAY SOURCE | TuA BS192ch | TuB Tera04ch | |
| | RESOLUTION | 1440 × 1080 | 720 × 480 | |
| | ASPECT RATIO | 16 : 9 | 4 : 3 | |
| | AUDIO | D5.1 | Stereo | |
| | DISPLAY POSITION | (xsA1,ysA1) | (xsB,ysB) | |
| | DISPLAY SIZE | D1 | D2 | |
| | AUDIO | MAIN UNIT, 1C | SECOND REMOTE CONTROL 2, 0D | |
| DISPLAY SCREEN INFORMATION 2 | IMAGE ID | ID3 | CLEAR | |
| | DISPLAY SOURCE | TuC Tera02ch | EXT VTR | |
| | RESOLUTION | 720 × 480 | 720 × 480 | |
| | ASPECT RATIO | 4 : 3 | 4 : 3 | |
| | AUDIO | BILINGUAL | Stereo | |
| | DISPLAY POSITION | (xsA2,ysA2) | CLEAR | |
| | DISPLAY SIZE | D3 | CLEAR | |
| | AUDIO | FIRST REMOTE CONTROL 1, 1A | CLEAR | |
| DISPLAY SCREEN INFORMATION 3 | | : | : | : |
| DISPLAY SCREEN INFORMATION 4 | | : | : | : |

FIG. 6

RDC TABLE FOR VIEWER A VIEWING

| | | REGION 1 | REGION 2 | ... |
|---|---|---|---|---|
| REMOTE CONTROL ID | | ID1 | ID2 | ... |
| OPERATING REGISTER | | VIEWING, MENU | CLEAR | |
| PRIORITY | | 1 | CLEAR | |
| DISTANCE | | L1 | CLEAR | |
| DISPLAY REGION | | (0,0) (xend,yend) | CLEAR | pp |
| SCREEN MODE | | SINGLE | CLEAR | |
| DISPLAY SCREEN INFORMATION 1 | IMAGE ID | ID1 · MAIN | CLEAR | |
| | DISPLAY SOURCE | TuA BS192ch | TuB Tera04ch | |
| | RESOLUTION | 1440 × 1080 | 720 × 480 | |
| | ASPECT RATIO | 16 : 9 | 4 : 3 | |
| | AUDIO | D5. 1 | Stereo | |
| | DISPLAY POSITION | (0,0) | CLEAR | |
| | DISPLAY SIZE | D1 | CLEAR | |
| | AUDIO | MAIN UNIT, 1C | CLEAR | |
| DISPLAY SCREEN INFORMATION 2 | IMAGE ID | CLEAR | CLEAR | |
| | ⋮ | ⋮ | ⋮ | |

FIG. 7

RDC TABLE 1 FOR VIEWERS A AND B INDIVIDUALLY VIEWING

| | | REGION 1 | REGION 2 | ... |
|---|---|---|---|---|
| REMOTE CONTROL ID | | ID1 | ID2 | ... |
| OPERATING REGISTER | | VIEWING | VIEWING | |
| PRIORITY | | 1 | 2 | |
| DISTANCE | | L1 | L2 | |
| DISPLAY REGION | | (0,0) (xe1,ye1) | (xs2,ys2) (xend,yend) | |
| SCREEN MODE | | SINGLE | SINGLE | |
| DISPLAY SCREEN INFORMATION 1 | IMAGE ID | ID1 · MAIN | ID2 · MAIN | |
| | DISPLAY SOURCE | TuA BS192ch | TuB Tera04ch | |
| | RESOLUTION | 1440 × 1080 | 720 × 480 | |
| | ASPECT RATIO | 16 : 9 | 4 : 3 | |
| | AUDIO | D5.1 | Stereo | |
| | DISPLAY POSITION | (xsA1,ysA1) | (xsB,ysB) | |
| | DISPLAY SIZE | D1 | D2 | |
| | AUDIO | MAIN UNIT, 1C | SECOND REMOTE CONTROL 2, 0D | |
| DISPLAY SCREEN INFORMATION 2 | IMAGE ID | CLEAR | CLEAR | |
| | ⋮ | ⋮ | ⋮ | |

FIG. 8

DISTANCE MEASUREMENT TABLE

| KEYS NECESSARY FOR DISTANCE MEASUREMENT |
|---|
| CURSOR UP |
| CURSOR DOWN |
| CURSOR LEFT |
| CURSOR RIGHT |
| ENTER |
|  |
|  |

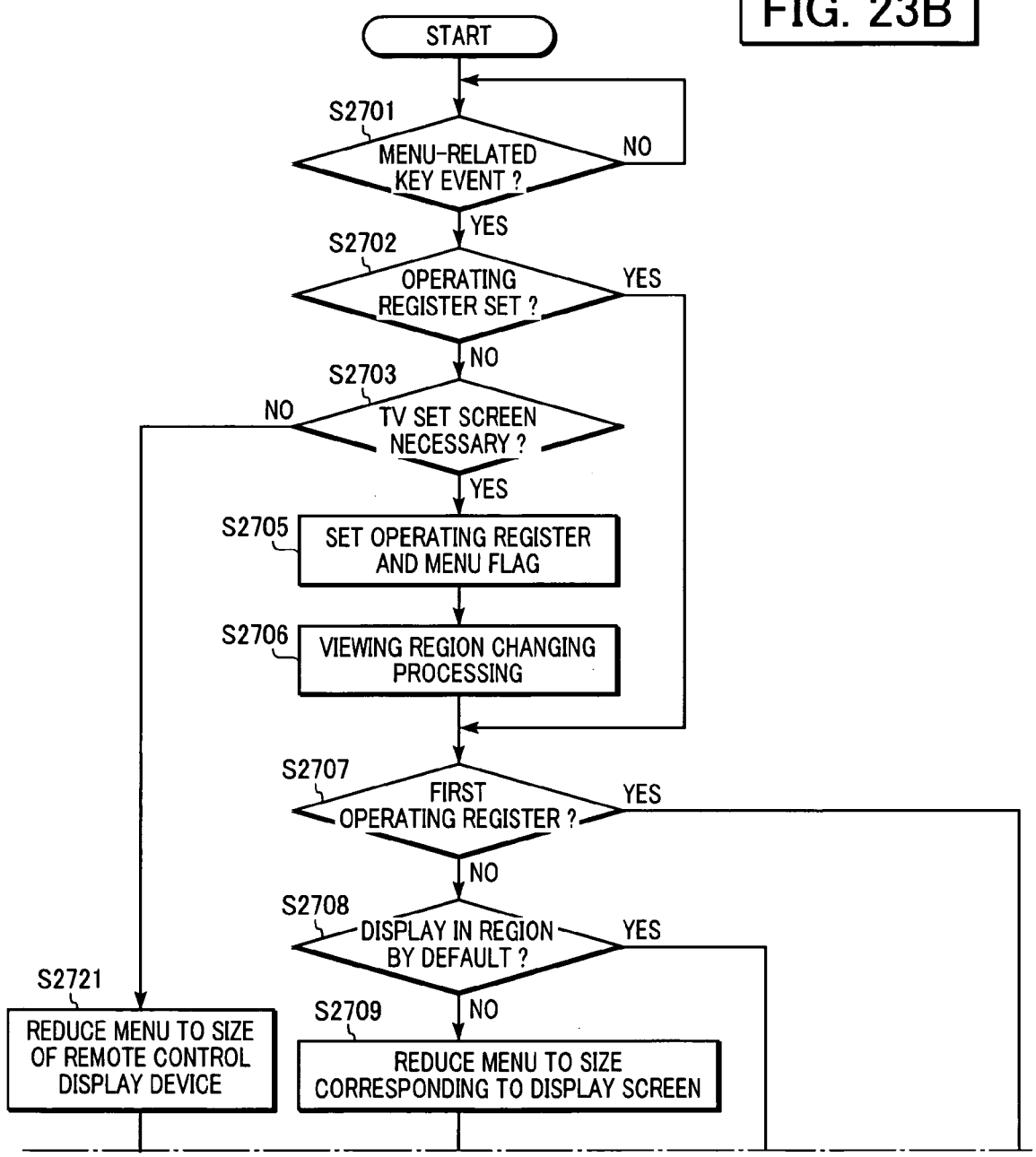

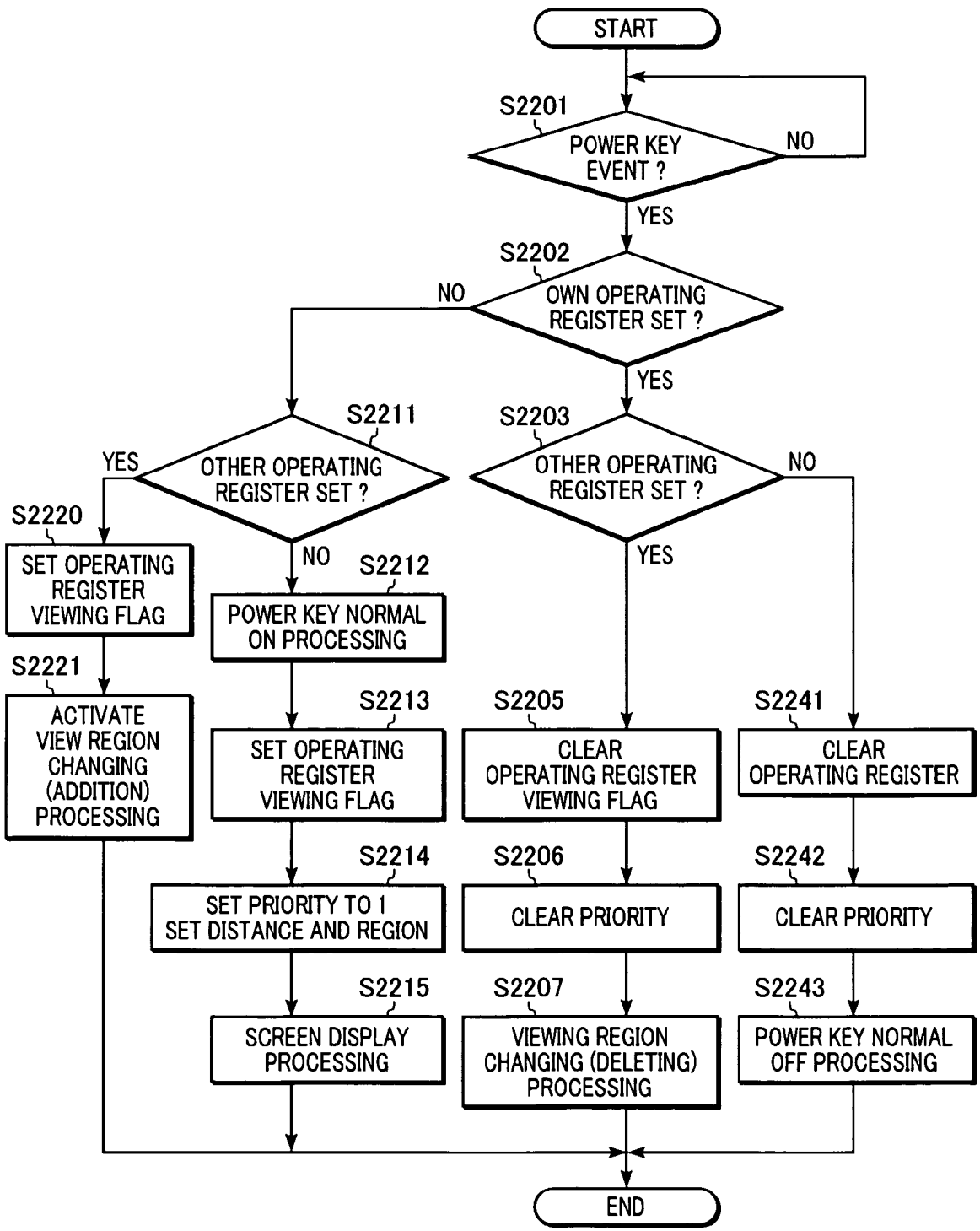

DISPLAY CONTROL DEVICE AND METHOD, AND DISPLAY SYSTEM

BACKGROUND OF THE INVENTION

1. Field of the Invention

The present invention relates to a control device and control method for controlling a display device which is capable of displaying multiple screens.

2. Description of the Related Art

Known examples of display devices include CRT devices, liquid crystal devices, plasma display devices, projection display devices, and so forth. These display devices have display regions, where multiple screens can be displayed. Japanese Examined Patent Application Publication 2001-94900 discloses a configuration regarding multiple remote controls being used and multiple screens being viewed, wherein aspect ratios and display positions are changed according to the positions of users.

However, with conventional configurations, each viewer could not perform separate control including electric power source control according to the screen display state, with predetermined commands from input devices. More specifically, as an example, let us say that a viewer is viewing a screen on a display device, but another screen is also being displayed on the same display device either due to another viewer requesting the second screen or the display device itself displaying the second screen. In the event that the viewer viewing the first screen finishes viewing and presses the power button, this would turn off the electric power for the display device itself, meaning that the second screen would go off as well.

The present Inventor has also noticed that displaying control information while viewing a screen results in the control information being displayed upon the screen being displayed in some cases, obstructing viewing of the screen.

SUMMARY OF THE INVENTION

The present invention has been made to solve the aforementioned problems, and accordingly, it is an object thereof to provide a control device and control method for controlling a display device such that multiple viewers watching separate screens on a single display device do not interfere with viewing of each other with control operations including operating the power source.

To this end, according to a first aspect of the present invention, a display control device for controlling a display device capable of displaying multiple screens on a display region, comprises a display control circuit for controlling the display device according to a command input from multiple input devices. The display control circuit controls the display device so as to delete a screen region controlled by a predetermined input device which is one of the plurality of input devices without turning the electric power source of the display device off in the event that a screen region to be controlled by another input device has been set, and turn the electric power source of the display device off in the event that a screen region to be controlled by another input device has not been set, in accordance with a predetermined command input from the predetermined input device.

A specific example of the input device is a remote control device. While pressing the power button of a remote control device transmits predetermined commands, for example, according to this aspect, multiple types of control can be assigned to a predetermined command, so that control is effected in different ways according to whether a screen region to be controlled by another input device has been set or not. Particularly, in the event that a screen region to be controlled by another input device has been set, pressing the power button of the remote control devices does not turn off the electric power source of the display device as with conventional arrangements but rather simply controls the display device so as to delete the screen region controlled by this input device, and leave the screen region controlled by the other input device displayed on the display device. On the other hand, in the event that there is no screen region set to be controlled by another input device, this action controls the display device so as to turn off the electric power supply thereof. Note that at the time of deleting the screen region, the screen to be displayed on the screen region may be displayed as a reduced screen (e.g., thumbnail), or as an icon or tab corresponding to this screen.

The concept of turning off the electric power of the display device here is not restricted to turning off all electric power of the display device, and rather includes realizing a state wherein part of the electric power is cut off and part of the electric power source supply is maintained, control for making transition to a state wherein the electric power supplied by the electric power source lower than the normal display state, and so forth. Preferably, control can be made so as to realize a standby state from which the display device can resume normal display under control by an input device or other control means.

Also, in the present Application, the term "screen region is set" means essentially to realize a state wherein it can be recognized that the state in which the screen region exists should be maintained. Various arrangements may be made to carry out this, such as the position of the screen region being set, a flag indicating that the screen region is in use being set, and so forth.

According to a second aspect of the present invention, a display control device for controlling a display device capable of displaying multiple screens on a display region comprises a display control circuit for controlling the display device according to a command input from multiple input devices. The display control circuit controls the display device so as to turn the electric power source of the display device on in the event that the electric power source of the display device is not on, and set a screen region to be controlled by a predetermined input device which is one of the plurality of the input devices in the event that the electric power source of the display device is on, in accordance with a predetermined command input from the predetermined input device.

With a preferable configuration, in the event that the electric power of the display device is not on, the electric power source is turned on according to the predetermined command and also control is effected to set the screen region to be controlled by the predetermined input device.

The concept of turning on the electric power of the display device here is not restricted to making transition from a state wherein all electric power to the display device is off to a state wherein electric power source supply is provided so as to enable normal display, rather, this also includes control for making transition from a state wherein a part of the electric power is being supplied (preferably, a state from which the display device can resume normal display under control by an input device or other control means) to a state wherein electric power source supply is provided so as to enable normal display.

According to a third aspect of the present invention, a display control device for controlling a display device capable of displaying multiple screens on a display region comprises a display control circuit for controlling the display device according to a command input from multiple input devices. The display control circuit controls the display device so as to turn the electric power source of the display device on in the event that the electric power source of the display device is not on, and in the event that a screen region to be controlled by another input device has been set, and realize a state wherein both the screen region controlled by the predetermined input device and the other screen region are set, in accordance with a predetermined command input from the predetermined input device.

While the first through third aspects of the invention indicate configurations using multiple input devices, the present invention also includes arrangements otherwise. That is to say, other screens to be taken into consideration are not restricted to screens controlled by input devices such as other remote control devices.

That is to say, the present invention has the following aspects wherein a "screen region other than the screen region to be controlled by the input device" may be a screen region controlled by another input device other than this input device and operated by a viewer of the display device, or may be a screen region which is not based on operations made by a viewer of the display device and rather is forcibly controlled by external commands not based on instructions from the viewer of the display device. The following fourth through sixth aspects of the present invention cover this concept.

That is, according to a fourth aspect of the present invention, a display control device for controlling a display device capable of displaying multiple screens on a display region comprises a display control circuit for controlling the display device according to a command input from an input device. The display control circuit controls the display device so as to delete a screen region controlled by the input device without turning the electric power source of the display device off in the event that a screen region other than the screen region to be controlled by the input device has been set, and turn the electric power source of the display device off in the event that a screen region to be controlled by another input device has not been set, in accordance with a predetermined command input from the predetermined input device.

Also, according to a fifth aspect of the present invention, a display control device for controlling a display device capable of displaying multiple screens on a display region comprises a display control circuit for controlling the display device according to a command input from an input device. The display control circuit controls the display device so as to turn the electric power source of the display device on in the event that the electric power source of the display device is not on, and set a screen region to be controlled by the predetermined input device in the event that a screen region is set on the display region, in accordance with a predetermined command input from the predetermined input device.

Further, according to a sixth aspect of the present invention, a display control device for controlling a display device capable of displaying multiple screens on a display region comprises a display control circuit for controlling the display device according to a command input from multiple input devices. The display control circuit controls the display device so as to turn the electric power source of the display device on in the event that the electric power source of the display device is not on, and in the event that a screen region other than the screen region to be controlled by the input device has been set, realize a state wherein both the screen region controlled by the input device and the screen region other than the screen region to be controlled by the input device are set, in accordance with a predetermined command input from the predetermined input device.

A specific example of such an aspect is a configuration wherein the display device displays a screen not based on user operations, i.e., a display control circuit sets a screen region either autonomously (independent of viewer operations), or forcibly in accordance with instructions of a transmitter of image signals which are to be displayed.

Note that the above-described different types of control according to a predetermined command (including arrangements wherein a predetermined control is performed in some cases and not performed in other cases) can be suitably realized by providing a state evaluating circuit for evaluating what case the current state is equivalent to. Of course, this evaluating circuit is not restricted to a circuit dedicated to such evaluation, and in the event that a circuit performing other processing is configured so as to be capable of this evaluation as well, this circuit becomes the evaluating circuit as referred to here. An example of such a circuit is a general-purpose arithmetic circuit which is operated by a program.

Note with the present invention, in the event that a particular screen region can be correlated with a particular input device with regard to a particular control, the particular screen region is the screen region controlled by the particular input device. As long as this condition is satisfied, the screen region controlled by a particular input device may be arranged to be controlled by control means other than the particular control device (e.g., other input devices). Let us say for example that there are two screen regions, with one input device (a first input device) corresponding to one screen region (a first screen region), wherein control of channel selection for the screen displayed on the first screen region is performed as the particular control thereof, and with other input means corresponding to another screen region (a second screen region), so that in the event that control the same as the particular control for the first screen region by the first input device (control for channel selection in this case) is to be performed regarding the second screen region, the first screen region is controlled by the first control device and the second screen region is controlled by the other control means. Now, an arrangement may be made wherein the other control means perform control such as adjusting the brightness of the screen, including the first screen region, but even in such cases, the first screen region is a screen region controlled by the first input device. Also, in the event that a particular input device can be correlated with a part of multiple screen regions with regard to a particular type of control, and cannot be correlated with the other screen regions regarding this type of control, the screen region correlated with the particular input device is the screen region controlled by the particular input device.

Also, according to a seventh aspect of the present invention, a display control device for controlling a display device capable of displaying multiple screens on a display region comprises a display control circuit for controlling display of screens corresponding to each of a plurality of input devices, and display of control information corresponding to at least a predetermined input device of the plurality of input devices. In the event that a screen region corresponding to an input device other than the predetermined input device has been set on the display region, the display control circuit controls the position of the region where the control information is displayed, such that a state can be realized wherein at least one part of the region where the control information is displayed does not overlap the screen region corresponding to the other input device.

A configuration partly sharing the feature of the above seventh aspect may be made wherein the display device sets a screen region independent from user operations. That is, according to an eighth aspect of the present invention, a display control device for controlling a display device capable of displaying multiple screens on a display region comprises a display control circuit for controlling display of each of a screen controlled by an input device and screens other than the screen controlled by the input device, and display of control information corresponding to the input device. In the event that a screen region other than the screen region controlled by the input device has been set on the display region, the display control circuit controls the position of the region where the control information is displayed, such that a state can be realized wherein at least one part of the region where the control information is displayed does not overlap the screen region other than the screen region controlled by the input device.

A specific example of a configuration for realizing such control is a configuration including a circuit, for recognizing the presence and position of the screen region regarding which a non-overlapping state is to be realized, in the display control circuit.

Control of the position of the region where the control information is to be displayed can be controlled by setting either absolute coordinates for stipulating the position, or relative coordinates as to a suitable object such as a screen or the like, to a desired value. An example is a configuration using a display device having a rectangular display region. With the upper left corner of the display region as the point of origin, the X axis is set in the horizontal direction and the Y axis in the vertical direction. In the event that a rectangular region is to be set as the region where the control information will be displayed, a region can be set from X(k) to X(k+200) for example in the X-axial direction, and from Y(p) to X(p+100) for example in the Y-axial direction, thereby setting a region 200 pixels in the horizontal direction by 100 pixels in the vertical direction, with the parenthesis indicating coordinates in increments of pixels. In this example, the position of the region for display in the control information is expressed by the four points of: the starting and ending points in the X-axial direction, and the starting and ending points in the Y-axial direction. Control of the position of this region for display in the control information may be such that all four points are variable, or with one or two of the points fixed and the remaining points variable. Another way of expressing the region where the control information is to be displayed is to set the coordinates of one point at the upper right of the region for example, and to specify the diagonal length of the region where the control information is to be displayed. Of course, shapes other than rectangles may be used for this region, as well, with similarly suitable methods being used for specifying the position thereof.

Now, while various configurations may be employed for effecting control such that a state can be realized wherein at least one part of the region where the control information is displayed does not overlap the screen region regarding which overlapping is to be avoided, one example is to display the region where the control information is displayed so as to overlap on the screen region correlated with the input device with which the control information is correlated.

Control information correlating to the input device may be information generated as a result of operating the input device, or selections to be made by operating the input device. For information displayed by operating the input device with regard to a television broadcast screen, an example of the former is information of a channel (e.g., channel No., etc.) selected by operating the input device, and an example of the latter is a program table including multiple programs which can be selected from by operating the input device.

The input device is preferably operated by the user of the display device, and in the event that there are multiple input devices probably, both the predetermined input device and the other input device are preferably operated by users, further preferably by different users of the display device, which may or may not be human beings.

A suitable arrangement for the displayed screen in the screen region controlled by the input device is a screen for displaying moving picture programs such as television programs and the like.

As mentioned earlier, remote control devices are suitably used for the input devices. The later-described embodiments disclose a configuration wherein multiple remote control devices are used as multiple input devices as a particularly preferable arrangement. Note that the phrase "remote control device" refers to a device capable of operating the display device at a distance from the casing which houses the display control circuit according to the present invention. However, with the present invention, the casing which houses the display control circuit may also be provided with an input portion such as buttons and the like, in which case the input portion functions as an input device.

The display control circuit may be configured as a single integrated circuit, or may be configured by combining one multiple circuits each having one or more functions.

According to another aspect of the present invention, a display control method for controlling a display device capable of displaying multiple screens on a display region comprises the steps of: accepting a predetermined command from a predetermined input device; and deleting a screen region controlled by a predetermined input device which is one of the plurality of the input devices without turning the electric power source of the display device off in the event that a screen region to be controlled by another input device has been set, and turning the electric power source of the display device off in the event that a screen region to be controlled by another input device has not been set, in accordance with a predetermined command.

More concisely, the method has a step for receiving predetermined commands from an input device, and a step for effecting control according to the predetermined commands. An example of receiving commands is a step wherein predetermined commands, generated by a remote control device or an input portion provided on the casing which houses the display control circuit being operated, are input to the display control circuit.

According to another aspect of the present invention, a display control method for controlling a display device capable of displaying multiple screens on a display region comprises the steps of: a first signal processing step for displaying screens corresponding to each of the a plurality of input devices; and a second signal processing step for displaying control information corresponding to at least a predetermined input device of the plurality of input devices. The second signal processing step comprises a step for, in the event that a screen region corresponding to an input device other than the predetermined input device has been set on the display region, controlling the position of the region where the control information is displayed, such that a state can be realized wherein at least one part of the region where the control information is displayed does not overlap the screen region corresponding to the other input device.

As a specific way of carrying out the signal processing for displaying screens corresponding to each of the multiple input devices, a configuration may be used which performs signal processing for forming image signals synthesized of image signals making up screens corresponding to each of the multiple input devices. Also, a configuration may be used which performs signal processing for forming image signals synthesized of image signals making up screens corresponding to the screen region corresponding to the predetermined input device and image signals making up screens corresponding to the screen region corresponding to an input device other than the predetermined input device. Further, a configuration may be used which performs signal processing for forming image signals synthesized of image signals for the control information and other image signals.

According to another aspect of the present invention, a display control method for controlling a display device capable of displaying multiple screens on the display region comprises a first signal processing control step for controlling display of each of a screen controlled by an input device and screens other than the screen controlled by the input device, and a second signal processing control step for displaying control information corresponding to at leas a predetermined input device of the input devices. The second signal processing control step comprises a step for, in the event that a screen region other than screen region controlled by the input device has been set on the display region, controlling the position of the region where the control information is displayed, such that a state can be realized wherein at least one part of the region where the control information is displayed does not overlap the screen region other than the screen region controlled by the input device.

According to additional aspects of the present invention, display control methods corresponding to the display control devices of the first through ninth aspects of the present invention can also be provided.

According to still other aspects of the present invention a display system can be comprises of a display device capable of displaying a plurality of screens on a display region, and a display control device according to the aspects of the present invention as discussed above.

Further objects, features and advantages of the present invention will become apparent from the following description of the preferred embodiments with reference to the attached drawings.

BRIEF DESCRIPTION OF THE DRAWINGS

FIG. 4 is a diagram illustrating an example of the first and second remote control devices.

FIG. 5 is a diagram describing an RDC table.

FIG. 6 is a diagram describing an RDC table with a viewer A viewing.

FIG. 7 is a diagram describing an RDC table with viewers A and B individually viewing.

FIG. 8 is a diagram describing a distance measurement table.

FIGS. 23A and 23B are diagrams describing the flow of menu processing operations.

FIG. 25 is a diagram illustrating an example of the flow of control operations using the power key.

DESCRIPTION OF THE PREFERRED EMBODIMENTS

Embodiments of the present invention will now be described with reference to the drawings.

First Embodiment

Figure 1:
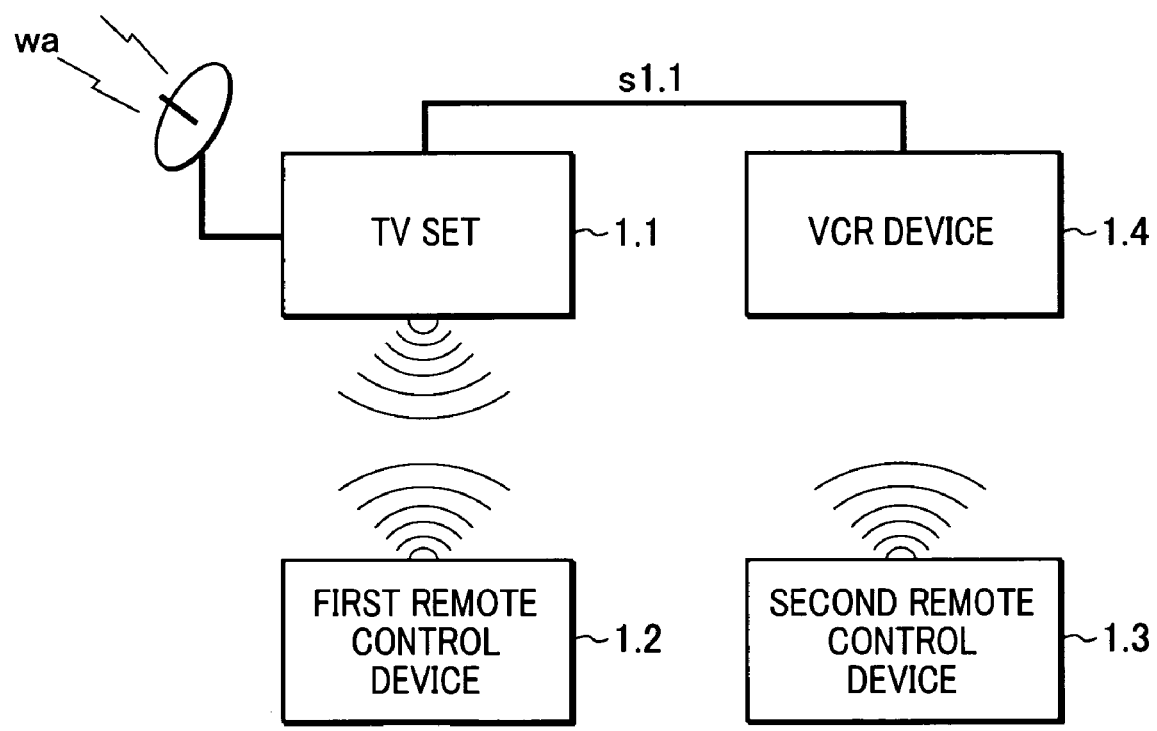
FIG. 1 is a block diagram illustrating the configuration of a system to which the present invention is applied.

FIG. 1 is a block diagram illustrating the configuration of a display system to which the present invention has been applied. In this drawing, reference numeral 1.1 denotes a television set for performing television reception, transmission/reception of data to and from devices connected to a network S1.1, and transmission/reception of data to and from first and second remote control devices 1.2 and 1.3, and displaying pictures and operation data and the like as well as outputting audio. The first and second remote control devices 1.2 and 1.3 are used for a single television viewer or multiple television viewers to control and operate the television set 1.1, a VCR device 1.4, and so forth. The VCR device 1.4 records and plays picture and audio data from the television and otherwise. These are controlled through the network S1.1, whereby the pictures and audio can be output to the television set 1.1. The network S1.1 connects the television set 1.1, the VCR device 1.4, and so forth, so that data can be transmitted and received.

Figure 2:
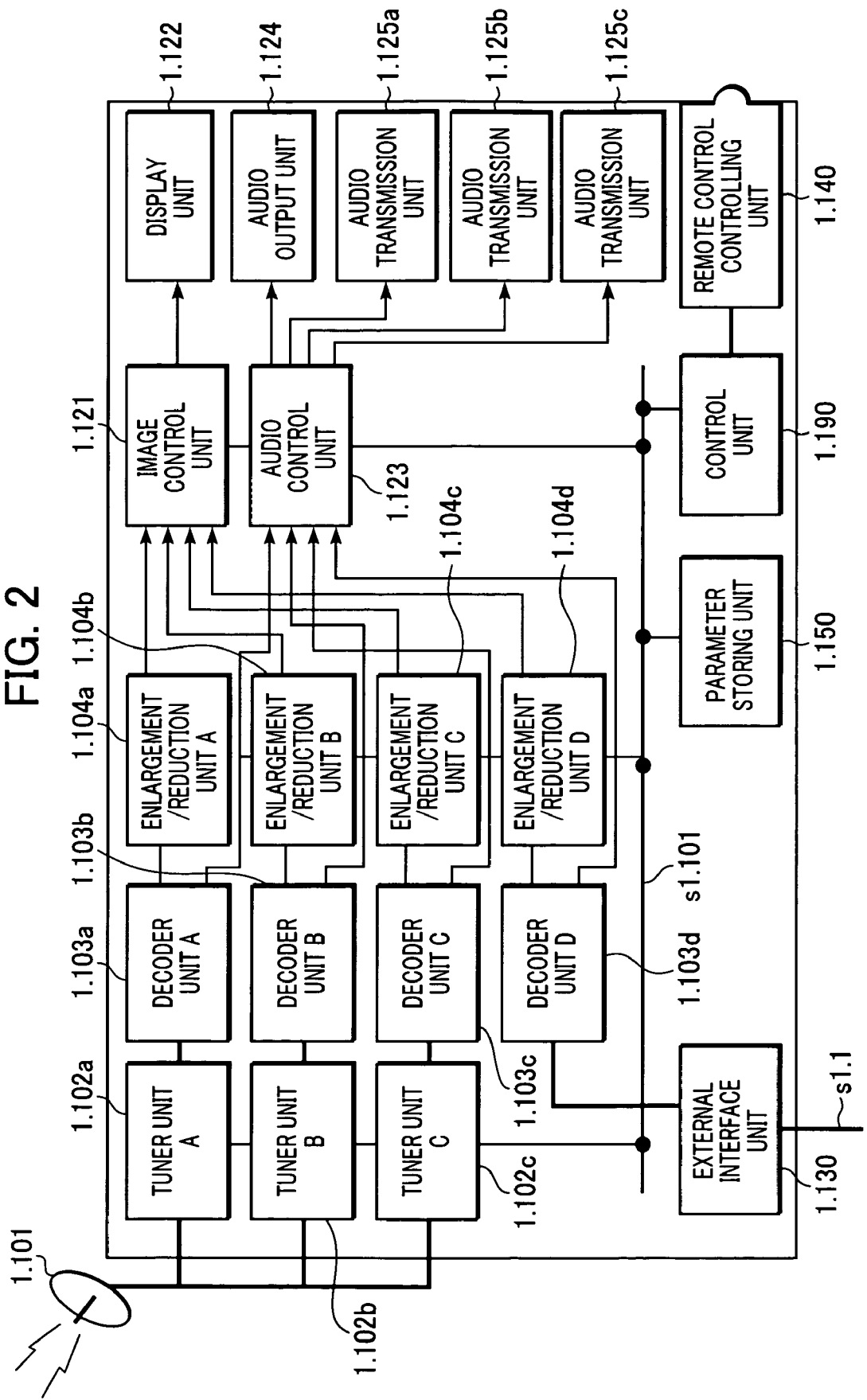
FIG. 2 is a block diagram describing the details of a television set.

FIG. 2 is a diagram describing the television set 1.1 in detail. A display system can be configured with this television set alone, as well. Reference numeral 1.101 denotes an antenna device for receiving external television airwaves and converting this into high-frequency electrical signals, which are introduced to a later-described tuner unit 1.102. Reference numerals 1.102a, 1.102b, and 1.102c denote tuner units, which perform amplification of the high-frequency television signals from the antenna unit 1.101, selection of desired stations, demodulating, splitting into picture/audio data and other data signals, and output of the picture/audio data to a decoder unit. Other data signals are output to a bus S1.101, if necessary.

Reference numerals 1.103a, 1.103b, 1.103c, and 1.103d are decoder units, for decoding the encoded picture/audio data from the above-described tuner units and a later-described external interface unit 1.130 so as to be capable of being subjected to later-described processing, display, and so forth, with the pictures being input to a later-described enlargement/reduction unit 1.104, and the audio to an audio control unit 1.123.

The enlargement/reduction unit 1.104 enlarges or reduces, or scales, the decoded picture signals according to the commands from a later-described system control unit 1.190, and outputs to an image control unit 1.121. The image control unit 1.121 switches between or synthesizes picture data from enlargement/reduction units 1.104a, 1.104b, 1.104c, and 1.104d, and OSD picture data selected via the bus S1.101, under control of the system control unit 1.190, and outputs to a later-described display device 1.122.

The display device 1.122 displays picture data from the image control unit 1.121. This display device is capable of simultaneously displaying all or part of four screens corresponding to picture signals input from each of the enlargement/reduction units 1.104a through 1.104d.

The audio control unit 1.123 switches between or synthesizes audio data from the tuner units 1.102a through 1.102c, the external interface unit 1.130, and the internal bus S1.101, controls volume, tone, presence, and so forth, and outputs to a later-described audio output unit 1.124 and audio transmission units 1.125a through 1.125c. The audio output unit 1.124 amplifies the audio signals input from the audio control unit 1.123, and outputs audio from the speakers. The audio transmission units 1.125a through 1.125c retransmit audio data from the audio control unit 1.123 to the first and second remote control devices 1.2 and 1.3.

The external interface unit 1.130 transmits and receives data between the television set 1.1 and the VCR device 1.4 via the bus S1.101. The remote control controlling unit 1.140 is a remote control transmission/reception control unit which uses infrared communication, exchanging data with the first and second remote control devices 1.2 and 1.3 from which transmission is made under operations of a viewer, and transmitting the received data to a system control unit 1.190.

Reference numeral 1.150 denotes a parameter storing unit for storing information regarding a remote control device which is operated, and information regarding the screen displayed by the remote control device. The later-described Remote-control/Display Control table (hereafter referred to as "RDC table") is within this parameter storing unit.

The enlargement/reduction units 1.104a through 1.104d, image control unit 1.121, system control unit 1.190, and parameter storing unit 1.150, together make up a display control circuit.

FIG. 5 illustrates an example of the contents of the RDC table. The television set 1.1 divides the display region of the display device into multiple regions (screen regions), enabling various types of display, operation, and control. The divided regions are operated with individual remote control devices, and the ID of the operated remote control device is registered in the item "remote control ID". With the present embodiment, a particularly suitable arrangement has been made wherein multiple screens controlled by the remote control device corresponding to each screen region can be displayed in each screen region. In the event that only one screen needs to be controlled by each remote control device, a configuration may be made wherein the screen is set equivalent to the one screen region controlled by each remote control device.

In the event that the remote control device is not operating the television set 1.1, i.e., in the event that no screen has been set thereby and no commands or data are being exchanged, an operating register is set to an all-clear state, and in the event that menu processing is being performed between the remote control device and the television set 1.1 though not displayed on the television set 1.1, a "menu flag" is set.

Also, in the event that display is being made on the television set 1.1, a "viewing flag" is set. In the event that a viewing flag is set for a region corresponding to the remote control ID "ID1", it can be understood that a screen region to be controlled by the remote control device having the ID of ID1 has been set. In the event that a viewing flag is set for a region corresponding to the remote control ID "ID2", it can be understood that a screen region to be controlled by the remote control device having the ID of ID2 has been set.

The distances between the television set 1.1 and the first and second remote control devices 1.2 and 1.3 are measured and transmitted to the television set 1.1 with the first and second remote control devices 1.2 and 1.3, where distance data regarding distance between the television set 1.1 and the remote control devices is stored. As for the display region, diagonal coordinates of the rectangular screen region which can be displayed, operated, and controlled with the remote control devices are stored.

An order of priority is established for cases wherein multiple screen regions compete for resources, with viewers who began viewing at an earlier point in time given higher priority. At the time of setting the operating register with a remote control device, other operating registers are inspected, and a value lower than that of the other operating registers is set. This value is cleared at the time of clearing the operating register. Output of audio from the television set 1.1 is given priority in order of the priority of the devices.

The screen mode sets the display mode such as the size of the screen displayed in the event that multiple screens are to be displayed within each screen region, including an option for displaying the screens at equal sizes. In the event that only one screen is to be displayed "single" is set here. This item remains cleared unless the region is being operated by the remote control device, i.e., no screens are controlled so as to be displayed in the region.

The display screen information is input information regarding the images, audio, and so forth, of each screen displayed within the screen region, made up of a screen ID assigned to each screen, input information such as input source, resolution, aspect ratio, audio format, and output information such as display start position, diagonal display size, audio output destination, volume, and so forth. The screen ID is set based on the input information in the event that a display is being made on the television set 1.1, and is clear otherwise. Up to four screen IDs can be assigned to each remote control ID. Once this information is stored, it is held even in the event that the electric power is turned off, and serves as a reference value at the next time a screen display is made.

FIG. 5 indicates that the first and second remote control devices 1.2 and 1.3 have transmitted some sort of data to the television set 1.1, whereby the remote control IDs thereof have been registered. The remote control device 1.2 has priority here. Two screens having screen ID1 and screen ID3 are displayed by the remote control ID1 based on the display screen information 1 and display screen information 2, and one screen having screen ID2 is displayed by the remote control ID2 based on the display screen information 2.

The system control unit 1.190 is connected to the later-described bus S1.101, and centrally controls the internal components of the television set 1.1. For television reception, the system control unit 1.190 controls the antenna unit 1.101 and the three tuner units 1.102*a* through 1.102*c*, and switches channels, performs billing control, performs control under EPG data, and so forth. The system control unit 1.190 also controls the enlargement/reduction units 1.104*a* through 1.104*d* according to the display size. Also, the system control unit 1.190 controls the image control unit 1.121, and performs synthesizing and display control of picture/audio signals from the tuner units 1.102*a* through 1.102*c* and VCR device 1.4, and icons and various types of information displays entering via the bus S1.101.

In the same way, the system control unit 1.190 controls the audio control unit 1.123 so as to control synthesizing and output of audio, and controls output to the audio output unit 1.124 and the audio transmission units 1.125*a* through 1.125*c*. Also, the system control unit 1.190 controls the external interface unit 1.130, and controls the VCR device 1.4 connected via the network S1.1 so as to exchange data therewith. Such control effected by the system control unit 1.190 is performed as suitable upon judging signals from the tuner units 1.102*a* through 1.102*c* and the external interface unit 1.130, based on signals from the remote control controlling unit 1.140.

The internal bus S1.101 is a data and control bus, within the television set 1.1 through which the picture and audio data is transmitted as well as various types of information, as described above.

Note that even in the event that the electric power source of the television set 1.1 is off, the external interface unit 1.130, the remote control controlling unit 1.140, the parameter storing unit 1.150, and the system control unit 1.190 remain operating to receive key data from the remote control devices and control the television set 1.1 and so forth.

Figure 3:
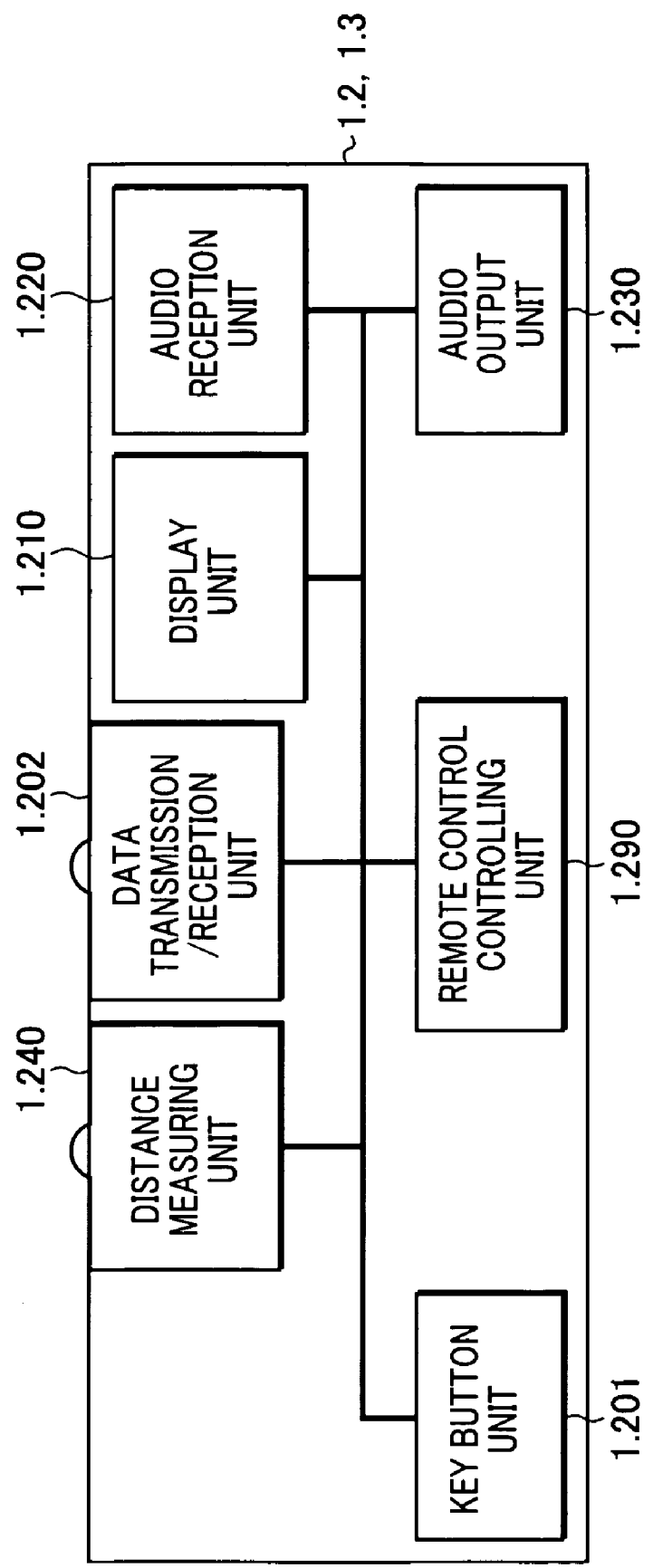
FIG. 3 is a block diagram describing the details of first and second remote control devices.

FIG. 3 is a detailed block diagram of the first and second remote control devices 1.2 and 1.3 used with the present embodiment. Both the first and second remote control devices 1.2 and 1.3 have the same configuration, so while the reference numerals indicate that the first remote control device 1.2 is being described, description will proceed here without giving consideration to which remote control device is being described unless stated otherwise.

Reference numeral 1.201 denotes a key button unit, where the later-described key 1.201*po*, key 1.201*mn*, and so forth, for operating the television set 1.1, are arrayed. Reference numeral 1.202 denotes a data transmission/reception unit for transmitting remote control data generated by the key button unit 1.201 to the remote control controlling unit 1.140 within the television set 1.1, receiving data from the television set 1.1, and so forth. Reference numeral 1.210 denotes a display unit for displaying operating information, messages, etc., necessary for operating the television device 1.1. The information and messages include those received from the television device 1.1.

Reference numeral 1.220 denotes an audio reception unit, whereby the remote control device 1.2 receives audio data transmitted from the audio transmission unit 1.125 and the remote control device 1.3 receives audio data transmitted from the audio transmission unit 1.125*b*, which is demodulated and output to the audio output unit 1.230. The audio output unit 1.230 amplifies the audio data from the audio reception unit 1.220, and outputs the audio data from the speakers.

Reference numeral 1.240 denotes a distance measuring unit which is of the same type used in cameras and the like, wherein infrared rays are emitted toward a subject of measurement, and the distance thereto is measured using the reflecting light therefrom. Pressing any of the buttons in the keyboard unit 1.201 toward the television set 1.1 emits an infrared ray toward the television set 1.1, whereby the distance from the remote control device to the television set 1.1 can be measured.

Reference numeral 1.290 denotes a remote control controlling unit, which scans the matrix of the key button unit 1.201, determines which keys have been pressed, applies a key code, controls the distance measuring unit 1.240, measures the distance between the television set 1.1 and the remote control device, controls a data transmission/reception unit 1.202 and communicates with the television set 1.1, thereby transmitting various types of data such as pressed key code information and distance measurement data, receiving various types of data such as messages, operating panels, icons, and so forth, displaying various types of information on the display unit 1.210 such as the received data, and controlling the volume of the audio data received with the audio reception unit 1.220, and so forth.

The remote control device has a unique remote control ID stored in the control unit 1.290, so that at the time of transmitting data, transmitting the remote control ID before transmitting the data allows the system to determine which remote control device is making the transmission. With the present embodiment, the remote control device 1.2 has the remote control ID of "ID1", and the remote control device 1.3 has the remote control ID of "ID2".

FIG. 4 illustrates an external view of either of the two remote control devices 1.2 and 1.3, corresponding to FIG. 3. Reference numeral 1.201*po* denotes the power key for turning the electric power source of the television set 1.1 on and off, and 1.201*sc* denotes a screen key for adding and deleting screens.

The television set 1.1 is arranged so as to be able to display up to four screens within a specified screen region with one remote control device, and the user can rotate from one to four screens by pressing the screen key 1.201*sc*. The contents are displayed based on the above-described display screen information, and a screen ID is assigned to each screen displayed.

Also, the screen key 1.201*sc* is used as a setting key for starting individual viewing with another remote control device. n the event that the screen key 1.201*sc* is pressed on another remote control device for another viewer, the later-described screen key processing and viewing region changing processing is activated so that a region independent from the other viewer is established, and up to four screens can be set within this region for viewing and operating the television set 1.1. Note that an arrangement may be made wherein commands for establishing a screen region at the time of starting display of a screen under control of the remote control device (and also turning on the power in some cases), and also deleting the screen region at the time of ending display of the screen controlled by the remote control device (and also turning off the power in some cases) are generated by operating the power key rather than the screen key 1.201*sc* described later.

Reference numeral 1.201*rs* is a screen resize key which, when pressed in a multi-viewer state, executes distance measurement between the television set 1.1 and the remote control device, based upon which the later-described viewing region changing processing is activated and the size of the screens displayed on the television set 1.1 are reset.

Reference numeral 1.201tv denotes the basic keys for television viewing, such as an input switching key, channel selecting keys, volume keys, and so forth. Reference numeral 1.201mn denotes extended television operations keys such as a menu key, up-down-right-left cursor keys, and so forth.

Next, the operations of the present embodiment will be described with reference to the above description and to FIGS. 9 through 21. First, several basic individual operations will be described. The operations at the remote control device side for key transmission between the television set 1.1 and the first and second remote control devices 1.2 and 1.3 according to the present invention, and distance measurement thereof, will be described with reference to FIG. 24.

The remote control device performs key scanning with the remote control controlling unit 1.290, to detect keys being pressed (S2801). Upon a television viewer pressing a key on the remote control device, key data corresponding to the button is generated, and transmitted to the remote control controlling unit 1.140 of the television set 1.1 from the data transmission/reception unit 1.202. The remote control ID data of the remote control device is included in the key data, so the remote control device which has transmitted the key data can be determined from the remote control ID data (S2802).

Next, the flow waits for response to reception of the transmitted key from the remote control controlling unit 1.140 (S2803). In the event that there is no response for a predetermined amount of time, judgment is made whether to execute error processing under the assumption that the pressed key was not correctly received by the remote control controlling unit 1.140 (S2821).

In the event that the key code is transmitted from the remote control device a predetermined number of times, and there is still no response, judgment is made that an error has occurred (S2821), error processing is performed, and the flow ends. In the error processing, an error display is made on the display unit 1.210, and an alarm is output at the audio output unit 1.230, thereby notifying the viewer that the pressed key was not correctly transmitted to the television set 1.1 (S2822). In the event that judgment is made that this is not an error, the flow returns to the key scan routine (S2802).

In the event that there is a response, a check is made regarding whether or not there is a distance data request within the response (S2803), and if so, judgment is made that the television set 1.1 and the remote control device are facing one another, and the distance measuring unit 1.240 measures the distance between the television set 1.1 and the remote control device (S2807). The distance data is then transmitted to the remote control controlling unit 1.140 of the television set 1.1 by the data transmission/reception unit 1.202 (S2809).

The flow waits for a response again (S2810) and in the event that there is a response, the flow ends normally. Otherwise, the same error judgment as S2821 is performed (S2841), and in the event of an error, error processing is performed (S2842), while otherwise, the flow returns again to the key scan routine, where the distance data is re-transmitted again, and the flow awaits a response from the remote control controlling unit 1.140.

Next, the control operations by remote control device at the television set 1.1 side will be described with reference to FIG. 18. The remote control controlling unit 1.140 of the television set 1.1 receives whether or not there is remote control key data, and upon receiving data (S2101), first, checks whether or not the electric power source is on (S2102).

In the event that the electric power is off, whether or not the received key data includes data equivalent to a command corresponding to the electric power key is checked, and in the event that the received key data does not include data equivalent to a command corresponding to the electric power key, a power off response is returned to the remote control device and the flow ends (S2141, S2142).

In the event that the power is on, or in the event that the power is off but the received key data includes data equivalent to a command corresponding to the electric power key, the remote control ID of the data is checked regarding whether the remote control ID has already been registered in the RDC table within the television set 1.1, and if not registered, the data is registered (S2103, S2104).

Subsequently, the key code is registered in the key buffer, and an event is activated with regard to the listener of the key code (S2105).

Further, whether or not the key data contains data equivalent to a command requiring distance is checked. Keys which require distance measurement are the power key, screen key, resize key, and keys registered in the later-described distance measurement key table. The distance measurement key table is such as shown in FIG. 8, with registration and cancellation being made by application programs deeming distance measurement to be necessary. The distance measurement key table is placed within the parameter storing unit 1.150 (S2106).

In the event that distance measurement is judged to be unnecessary, the response to the key reception is a distance measurement unnecessary response (S2107). In the event that distance measurement is judged to be necessary, a distance data request response is transmitted to the remote control device 1.2 or 1.3, and distance data is received (S2121, S2122).

In the event that the distance data cannot be received for a predetermined amount of time, error processing is performed based on the same processing as the aforementioned S2621 (S2131). In the event of judging that an error has occurred, the error response is returned to the remote control device 1.2 or 1.3, and the flow ends (S2131, S2132). In the event of judging that an error has not occurred, a distance data request response is returned again (S2131, S2121).

In the event that the distance data is received, a distance data reception response is returned (S2122, S2123), and the distance data is written to the distance data space for the corresponding remote control ID on the RDC table (S2124).

Next, processing regarding the power key pressed when the viewer turns the power on or off, or when finishing individual viewing, will be described with reference to FIG. 19. The electric power key processing waits for a power source key event to occur from the key reception processing unit. In the event that a power source key event is confirmed, whether or not the flag of the operating register in the RDC table in the parameter storing unit 1.150 has been set is checked. In the event that there is no flag set in the operating register for the remote control ID of the remote control device transmitting the key data, or no flag set of an operating register for the remote control ID of another remote control device, the electric power source is judged to be off, and electric power source on processing is performed by the television set 1.1 (S2202, S2211).

Subsequently, in the RDC register, the viewer flag is set for the operating register corresponding to the operated remote control ID, the priority is set to "1" which is highest priority, the remote control distance is set, and the display region is set to the entire screen, and screen display processing is activated and the flow ends (S2211, S2212, S2213, S2214). Thus, the screen region corresponding to this remote control device is set.

In the event that the operating register of the remote control ID of the remote control device which has transmitted the key data is not set, but an operating register of a remote control ID of another remote control device has been set, the television set 1.1 determines to be operated by a remote control ID of another remote control device other than the remote control device which has transmitted the key data, and accordingly key invalid alarm processing is performed since the power on/off processing cannot be performed (S2202, S2211, S2231). As shown in a later-described example, a screen region corresponding to this remote control device may be set at this time, but this function is not provided to the power key in the present embodiment.

In the event that a flag is set for the operating register of the remote control ID of the remote control device which has transmitted the key data, but no operating register is set for a remote control ID of another remote control device, the television set 1.1 is in a power on state and is not being operated by any other remote control device than the remote control device which has transmitted the key data (i.e., a case wherein no screen region is set other than the screen region controlled by this remote control device), so the key pressing action is judged to be an electric power off action, and accordingly all flags of the operating register corresponding to the remote control ID of the remote control device which has been operated are cleared, and the priority is cleared following which power off processing is executed and the electric power source of the television set 1.1 is turned off (S2202, S2203, S2241, S2242, S2243).

In the event that both the operating register for the remote control ID of the remote control device which has transmitted the key data, and the operating register for the remote control ID of another remote control device, are set, the television set 1.1 has another screen region set other than the screen region controlled by this remote control device, so judgment is made that the television set 1.1 is in a power on state and that one viewer in the individual viewing mode is going to terminate viewing. Accordingly, instead of performing power off processing, deleting processing is performed for the screen region controlled by this remote control device. In this case, the viewing flag and priority of the remote control device which has transmitted the key data is cleared, and the later-described viewing region changing processing is carried out (S2202, S2203, S2205, S2206, S2207).

Next, screen key processing executed upon the screen key being pressed at the time of starting individual viewing screen will be described with reference to FIG. 20. As described above, in the event that operations are already being made with that remote control device, screens are added or deleted.

The screen key processing unit awaits a screen key event to occur from the key reception processing unit (S2301). Upon confirmation of the screen key being pressed, whether or not the viewing flag is set for the operating register for the remote control ID of the remote control device of which key has been pressed is checked (S2302), and in the event that this is not set, judgment is made that the key has been pressed on a remote control device which is not operating the television set 1.1, i.e., to start new individual viewing, so the later-described viewing region changing processing is activated in order to set a screen region to be controlled with this remote control device (S2303). Now, display on the new screen region (i.e., display of a new screen) can be started simultaneously with setting of this screen region.

In the event that the viewing flag for the operating register for the remote control ID of the remote control device of which key has been pressed is already set, judgment is made that this is a change of screen mode with a remote control device already operating a screen, so addition or deletion of a screen is performed within the region corresponding to the remote control ID of the remote control device of which key has been pressed. This processing involves checking the number of screen IDs within the corresponding region, and in the event that the number of screens is less than four a new screen ID and display screen information is added, while in the event that the number of screen IDs is four, the screen IDs for the three screens other than the main screen are cleared (S2311).

Further, whether or not the distance of the remote control device with this remote control ID has changed is checked (2312), and if so, viewing region changing processing is performed (S2304), otherwise, screen display processing is performed for the corresponding region (S2313).

Next, the screen display processing will be described with reference to FIG. 21. With screen display processing, first, the number of screen IDs, the screen mode (such as two screens, one large and one small, or two screens in the same size), and the main screen are inspected by the setting values within the RDC table corresponding to the remote control ID (S2401, S2402, S2403). The screen sizes and start positions are determined based on the information and written to the display screen information, and display is performed based on this display screen information. Changing of the screen mode or main screen is performed by changing the screen mode, which is a menu operation (S2404).

The priority is checked, and in the event that this is "1", the audio for the main screen is output from the television set 1.1 main unit (S2408, S2409), and otherwise, audio is transmitted from the audio transmission units 1.125a and 1.125b (S2421).

Next, the viewing region changing processing, whereby screen size changing and displaying is performed, which is necessary in the event that regions are added or deleted in individual viewing or in the event that the distance between the remote control device and the television set has changed, will be described with reference to FIG. 22.

First, the number of viewing regions n is determined by the number of viewing flags of operating registers or later-described menu flags set (S2601), following which the priority of the viewing flags is reset in the order that they were set (S2602).

In the event of adding a region, next, the screen ID of the display screen information for the remote control ID of the remote control device being operated is checked within the RDC table, to check whether or not a screen is to be added, and in this case, the input image to be displayed and the audio are decided (S2603, S2604).

At this time, in the event that there is old information left within the RDC table for the input information of the display screen items corresponding for the remote control ID of the remote control device being operated, this is used (S2605), while in the event that there is no such information and the screen is new, the channel with the lowest frequency of an unused tuner is set in the RDC table as the input source. Selection of input information can be made by other methods, as well (S2621).

Next, based on the remote control device with the shortest distance to the television set, the ratio Ri for the distance between the television set and the other remote control devices is calculated from the distance data of the remote control device with the remote control ID of which operating register is set, and whether or not this is within a predetermined maximum distance ratio value Rmax is checked (S2607).

In the event that this is within the range, the obtained distance ratio Ri is set as the screen size parameter Pi (S2608), and in the event that this exceeds the range, the maximum distance ratio value Rmax is set as the screen size parameter Pi. An n−1 number of screen size parameters Pi are created for an n number of regions (the same as the number of remote control devices and operating register viewing flags) (S2641).

Further, each screen region and the size of the largest display screen are determined such that the ratio of the diagonal line Di of the largest screen which can be displayed on each of the n regions is calculated so as to satisfy $$P1:P2:\ldots:Pn-1=D1:D2:\ldots:Dn.$$

That is to say, the farther the viewer is from the television set, i.e., the greater the distance between the television set and the remote control device is, the greater the screen region and display screen size is. Also, the maximum distance ratio value is set so that the display screen size can be prevented from becoming excessively small in the event that the distance between the television set and the remote control device becomes small.

The maximum screen size which can be displayed within each region is a display with the aspect ratio of the display screen information set for the main screen in the display screen information for each region. Using this aspect ratio enables screen sizes to be determined taking into consideration the aspect ratio of the screen (S2609). The aforementioned screen display processing is performed for each region, screen display is performed, and the flow ends (S2610).

Figure 23B:
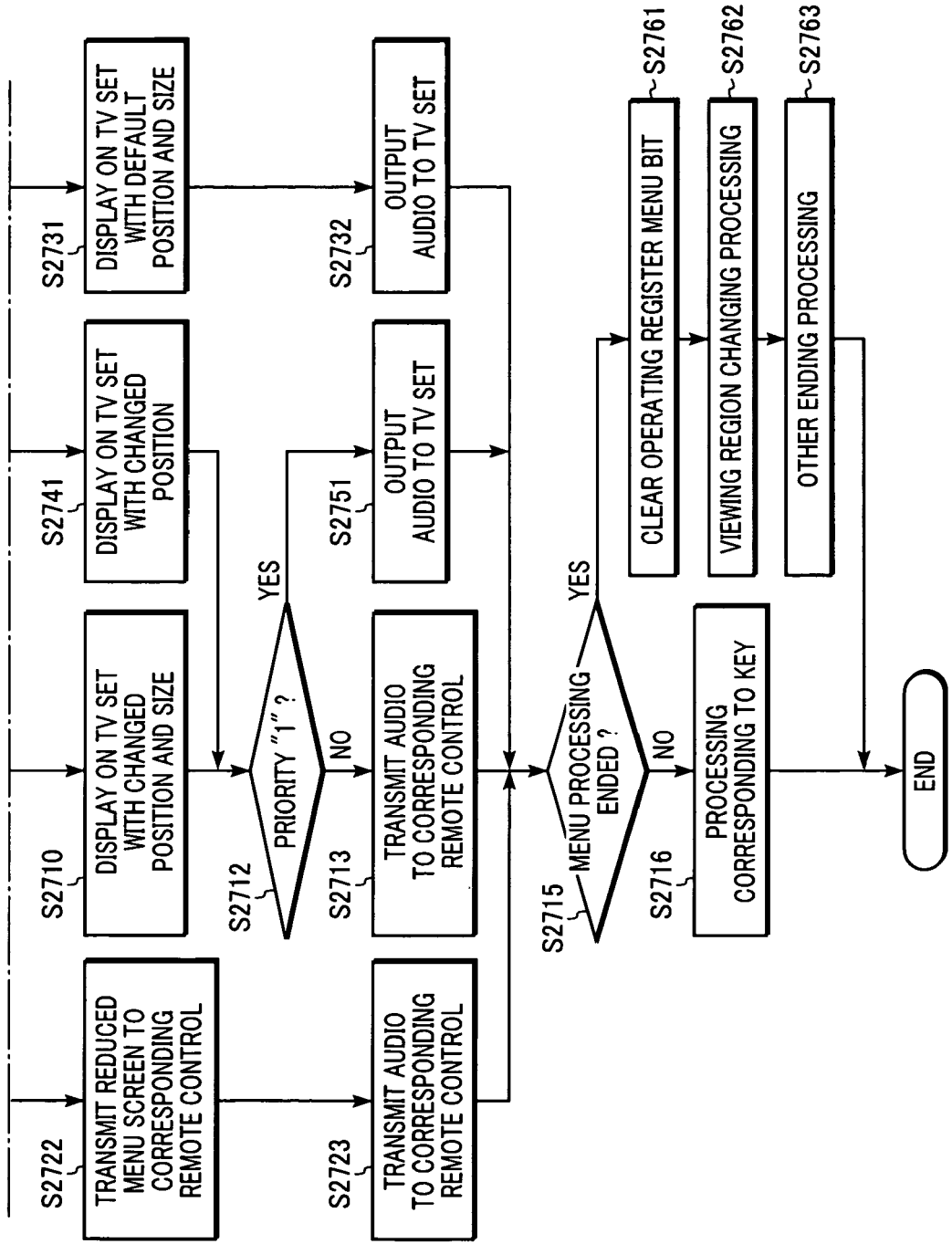

Next, menu processing will be described with reference to FIG. 23. With menu processing, the flow stands by awaiting a menu-related key event to occur. Upon a menu event occurring, whether or not an operating register has been set is checked (S2702), and in the event that this is set, judgment is made that display is already being made by the remote control device which has caused the menu-related key event to occur, so the flow jumps to S2707, and menu screen display is performed by the menu-related key event processing.

In the event that there is no operating register set, whether the menu screen display for the menu key event processing can be displayed on the remote control device, or whether display on the television set is necessary is judged (S2703), and in the event that display on the television set is judged to be necessary, then an operating register menu flag is set, and other registers perform the viewing region changing processing so as to secure a screen region (S2705, S2706). Upon a screen region being secured, the menu screen is displayed.

Now, whether the region where an operating register is set is one or not is checked (S2707), and in the event that this is one, this means that one remote control device is used for display on the entire screen, so the menu screen is displayed at the default size at the default position, and in the event that there is audio, the audio is output from the television set (S2731, S2732).

In the event that multiple regions have operating registers set, whether or not display can be made within the region corresponding to the remote control ID of which the menu screen size is operated is judged (S2708), and in the event that the menu screen can be displayed without changing the size thereof simply by changing the coordinates thereof, the coordinates are changed and the menu screen is displayed within the. region. Further, whether the priority is "1" or not is checked, and in the event that this is "1", audio output is performed from the television set. Otherwise, the audio is transmitted to the corresponding remote control device being operated (S2741, S2712, S2713, S2751). In the event that display cannot be made within the region due to size, the size of the menu screen is reduced to a suitable size, coordinates thereof are determined, and the menu screen is displayed within the region (S2709, S2710). The screen region corresponding to the remote control device is first set and then the menu screen, which is the control information, is displayed on this screen region, so situations wherein the menu screen is displayed on a screen region other than the screen region controlled by this remote control device can be avoided. Note that various other methods can also be used to avoid at least part of the control information such as this menu screen being displayed overlapping on other screen regions, any of which can be employed as long as the control information is displayed by selecting a position wherein overlapping onto other screen regions can be suppressed based on the coordinates data for each screen region.

Then, in the same way as above, whether the priority is "1" or not is checked, and in the event that this is "1", audio output is performed from the television set, otherwise, the audio is transmitted to the corresponding remote control device being operated (S2712, S2713, S2751).

On the other hand, in the event that judgment is made in S2703 that the menu display can be made on the display of the remote control device, processing is performed to reduce the sizes of the menu screen so as to be displayed on the remote control device, the display data is transmitted from the remote control controlling unit 1.140 to the remote control device performing the menu operations where it is display, and in the event that there is audio, this is also transmitted from the audio transmitting unit (S2721, S2722, S2723).

Now, upon display of the menu screen and audio output control finishing, judgement is made by key processing regarding whether or not menu processing has ended (S2715), and in the event that this has not ended, the corresponding key processing is performed, this key processing is ended, and a subsequently key input interruption is awaited (S2716). In the event that the key processing is to end the menu operations and the menu display, the menu flag of the operating register is cleared and viewing region changing processing is performed, and in the event that there is a display region therefor this is deleted, other ending processing is performed, and the menu processing is ended (S2761, S2762, S2763).

Next, as a first operating example, individual screen viewing operations of the television set 1.1 by a viewer A having the first remote control device 1.2 at a distance "L1" from the television set 1.1 and by a viewer B having the second remote control device 1.3 at a distance "L2" from the television set 1.1 will be described. Let us say that the distances L1 and L2 are in a relation of L1>L2, wherein the ratio L1/L2 is within the maximum distance ratio range Rmax.

Figure 9:
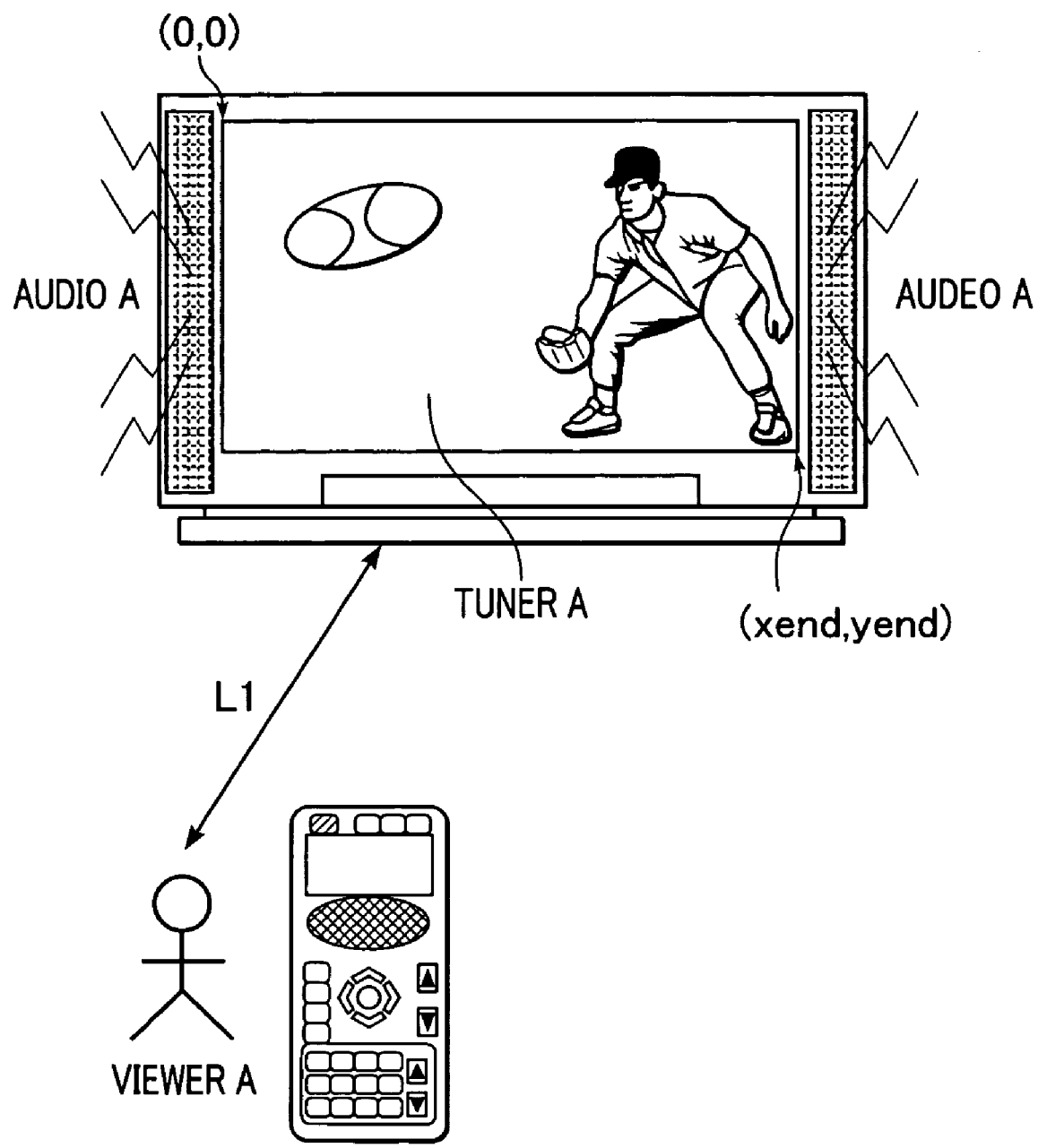
FIG. 9 is a diagram illustrating an example with the viewer A viewing alone.
Figure 18:
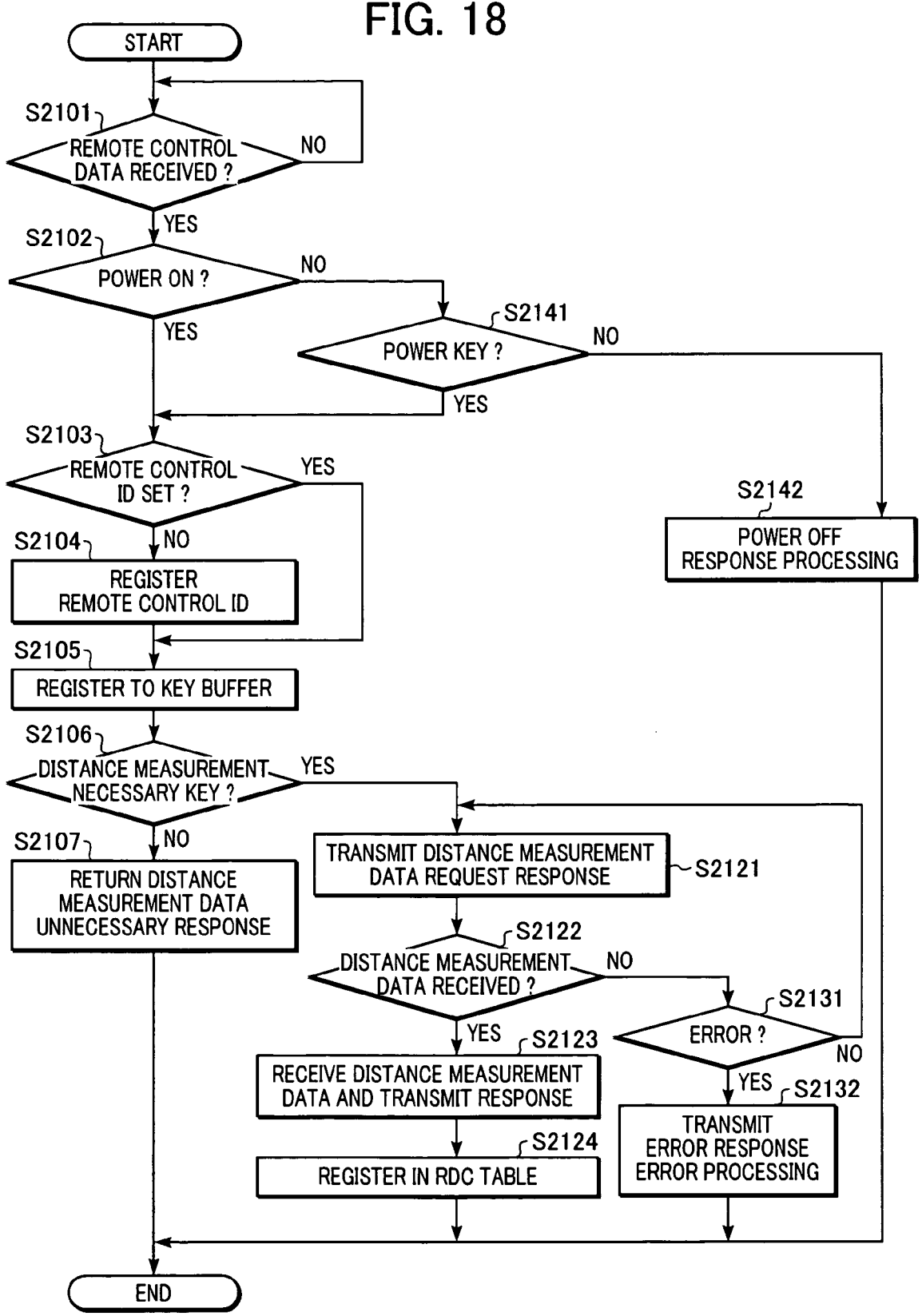
FIG. 18 is a diagram describing the flow of key reception operations.
Figure 24:
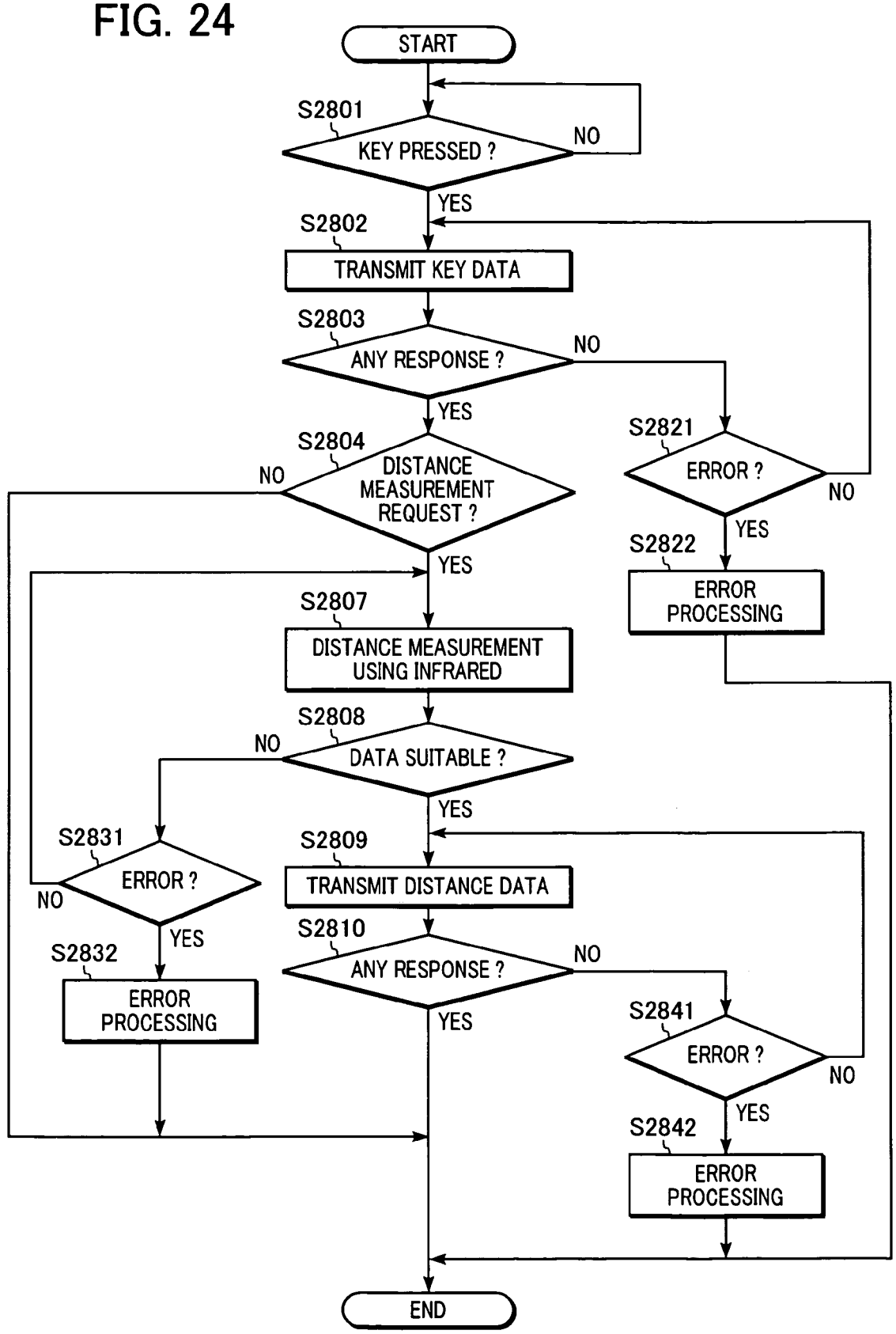
FIG. 24 is a diagram describing the flow of remote control processing operations.

First, as shown in FIG. 9, upon the viewer A at the distance L1 from the television set 1.1 pressing the power switch of the first remote control device 1.2 so as to turn the electric power source of the television set 1.1 on, the remote control ID and key data, and distance data, are transmitted from the first remote control device 1.2 to the television set 1.1 according to the operations shown in FIGS. 18 and 24.

Figure 19:
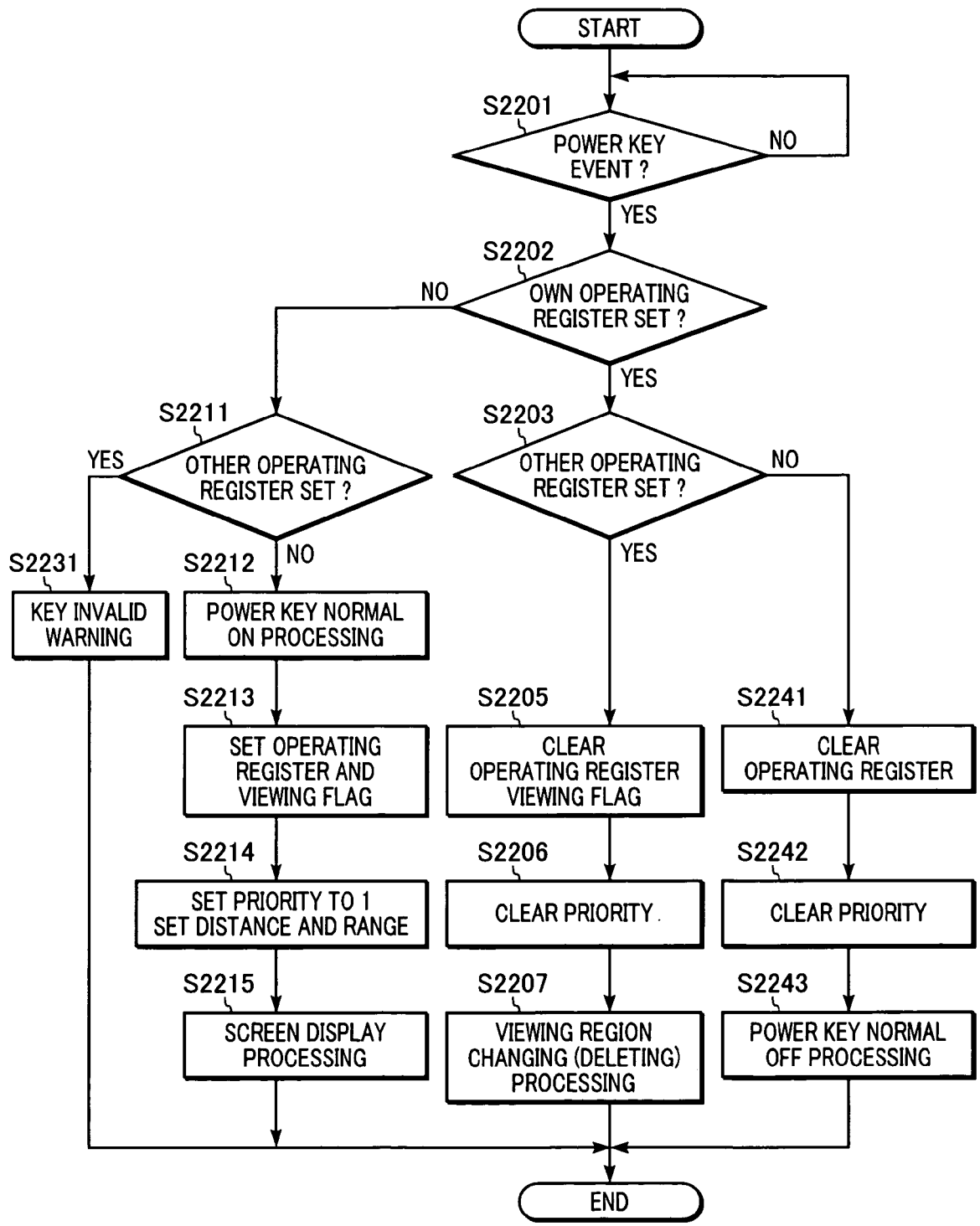
FIG. 19 is a diagram describing the flow of power key operations.

Next, following the flow in FIG. 19, the distance L1 is set in the RDC table for the remote control ID1 as shown in FIG. 6, the viewing flag of the operating register is set, the priority is set to "1", and coordinates for indicating the entire screen ((0, 0), (xend, yend)) are set to the region 1. Other values in the RDC table are contents which were set previously by operating the remote control device 1.2, and held. Screen display is started following the screen processing shown in FIG. 21 described above, and viewing is started with channel BS 192 of the tuner A being displayed alone over the entire screen with an aspect ratio of 16:9, as shown in FIG. 9. The audio is emitted from the audio output unit 1.124 of the television set 1.1.

Now, let us say that the viewer B presses the screen key of the second remote control device 1.3 to conduct individual viewing. The remote control ID, screen key data, and distance data are transmitted from the second remote control device 1.3 to the television set 1.1 according to the operations shown in FIGS. 18 and 24, in the same way as described above.

Figure 20:
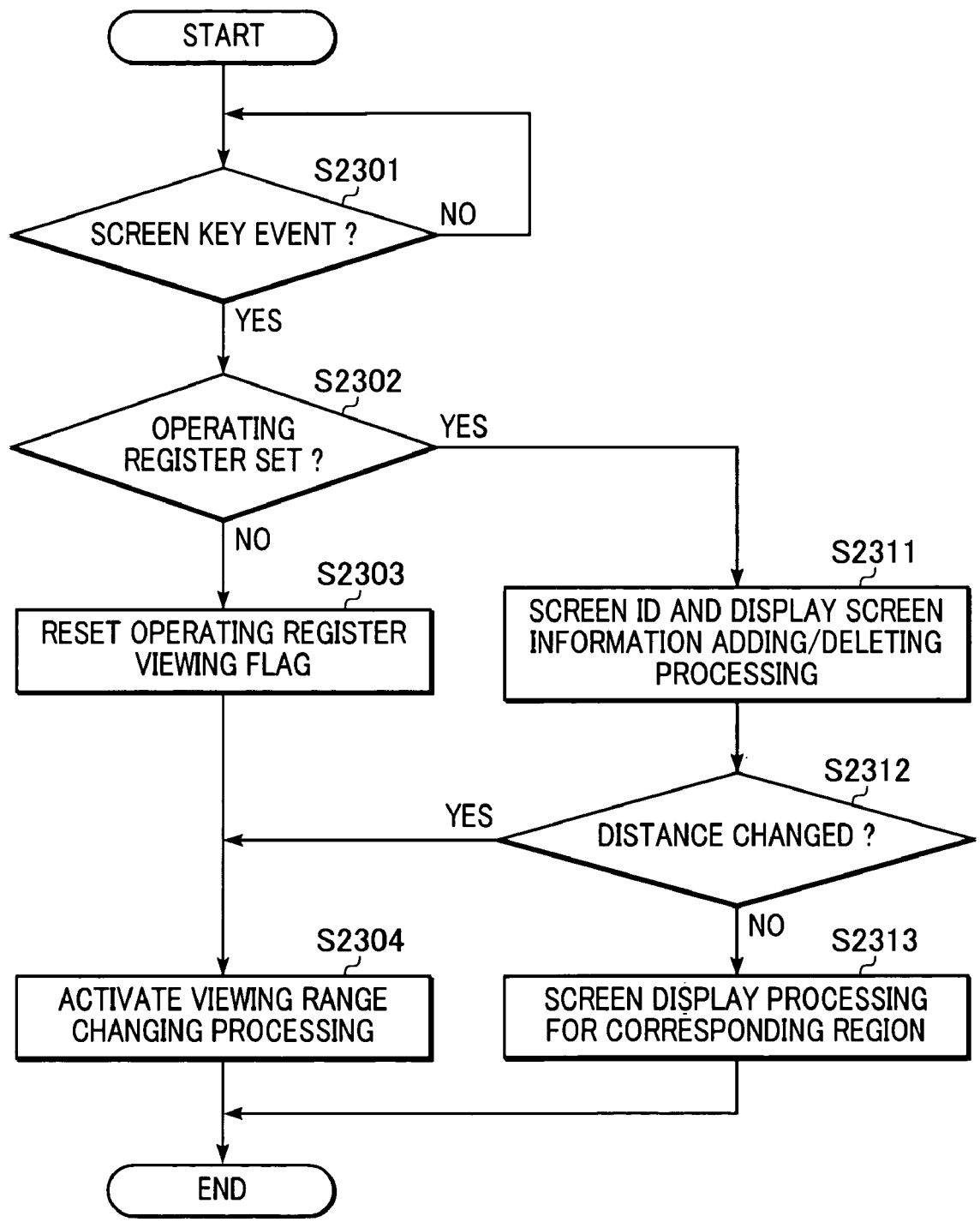
FIG. 20 is a diagram describing the flow of screen key operations.

Next, following the flow in FIG. 20, the operating register of the remote control ID 2 in the RDC table is set to "viewing" as shown in region 2 in FIG. 7. The other RDC table values are inspected, and the region 1 is set to "1" for priority, so the priority for the region 2 is set to "2", the distance is set to the measurement data L2, and the viewing region changing process is activated. Other values in the RDC table are contents which were set previously by operating the second remote control device 1.3, and held. This sets the screen region to be controlled by the second remote control device 1.3.

Following the viewing region changing processing in FIG. 22 described above, the number of viewing regions is determined to be 2, and the region 2 is understood to have been added later since the priority of region 1 is "1" and the priority of region 2 is "2", but the display screen information of Tuner B receiving terrestrial broadcast channel 4 and displaying at a screen aspect ratio of 4:3 is still remaining in the region 2, so this is determined to be displayed.

The distance ratio L1/L2 is determined from the distance L1 and the distance L2, which is within the maximum distance ratio range Rmax, so the distance ratio is determined to be used as a screen size parameter, and region 1 ((0, 0), (xe1, ye1)), and region 2 (xs2, ys2), (xend, yend)) are determined such that the ratio of diagonal lines of the largest display screens within the two regions equals $$L1/L2 = D1:D2.$$

Figure 10:
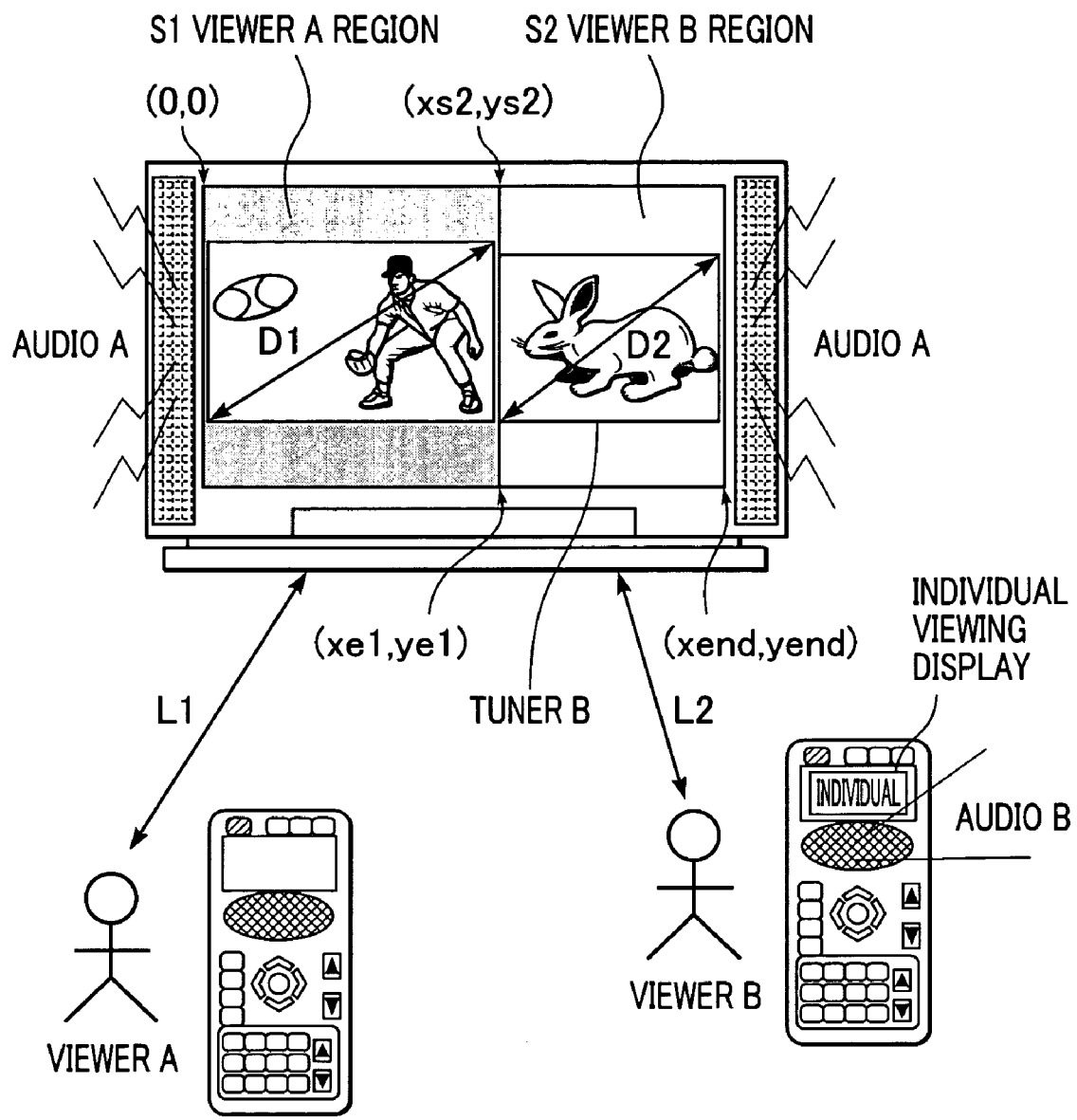
FIG. 10 is a diagram illustrating an example with the viewers A and B viewing individually.
Figure 21:
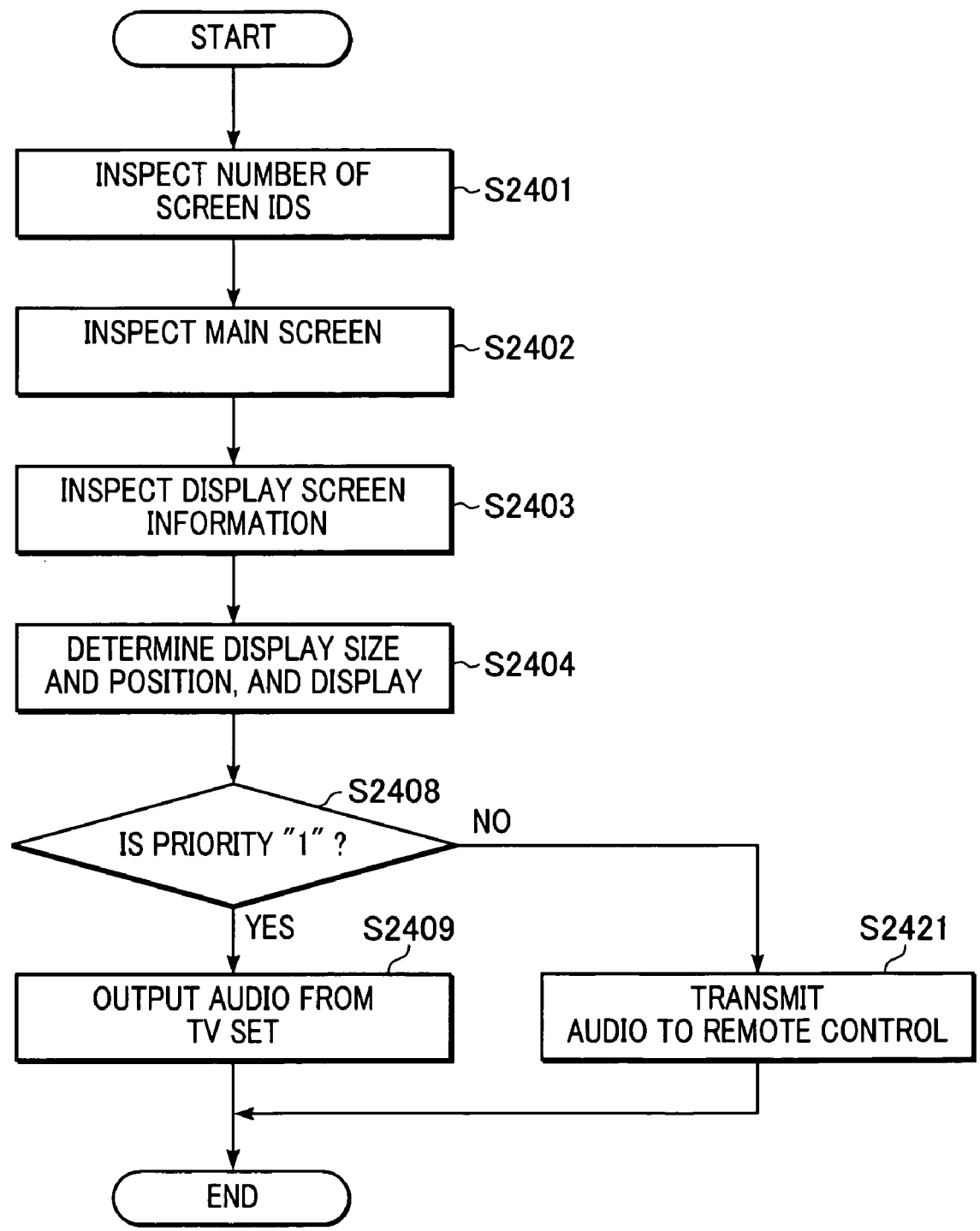
FIG. 21 is a diagram describing the flow of screen display operations.

The ratio is written to the display region in the RDC table, and the screen display processing shown in FIG. 21 described above is performed so as to make a display such as shown in FIG. 10, so that the audio of the Tuner A for the region 1 and display screen information 1 is output from the television set 1.1 main unit in the same manner as before according to the audio priority, and the audio of the Tuner B for the region 2 and display screen information 1 is transmitted from the audio transmission unit 1.125a to the second remote control device 1.3.

Next, a case wherein the viewer B conducting individual viewing moves from the distance L2 to the same distance L1 as the viewer A, and then presses the resize key of the second remote control device 1.3, will be described as a second operating example. Upon the resize key being pressed, the key data is received based on the flow shown in FIGS. 18 and 24, the key data is recognized as resize key data, a distance data request is made to the second remote control device 1.3, the second remote control device 1.3 measures the distance L1, and transmits this to the television set 1.1. Upon receiving the data, the television set 1.1 writes the distance data to the distance item in the region 2 in the RDC table corresponding to the remote control ID 2, and activates viewing region changing processing.

Figure 11:
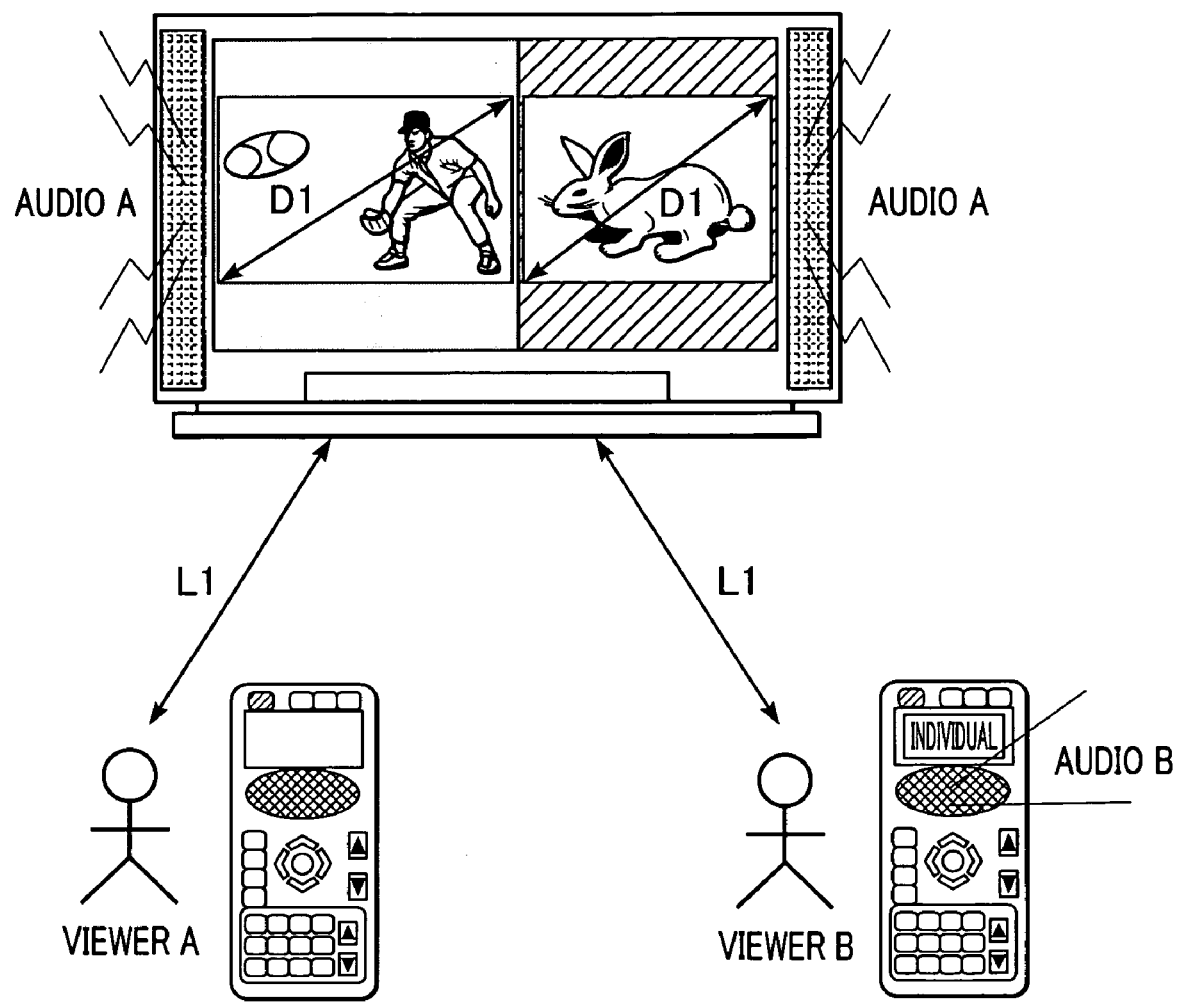
FIG. 11 is a diagram illustrating an example with the viewers A and B viewing individually.

In the region viewing changing processing, the screen contents are left unchanged by the screen size parameters that are recalculated, based on which the regions are recalculated and the region coordinates are written, and display is made again as shown in FIG. 11, based on the screen display processing shown in FIG. 21. In FIG. 11, the viewer B has moved away from the television set 1.1, and accordingly the screen size for the viewer B has increased, compared with FIG. 10. Conversely, in the event that the viewer B moves closer to the television set 1.1, the screen size of the viewer B becomes smaller. In the event that the viewer moves away or moves closer so as to exceed a certain range, such that Rmax is exceeded, the screen size does not get any larger or smaller.

Next, a case wherein, in the state of the first operating example, the viewer A presses the screen key to display multiple screens within his/her region, the region 1, will be described as a third operating example. Let us say that the screen mode has been set by menu operations to large/small screens.

Upon the viewer A pressing the screen key, the key data and distance data is received based on the flow shown in FIGS. 18 and 24 in the same way as described above, following which the RDC table is inspected based on the screen key processing shown in FIG. 20, showing that the number of screen IDs corresponding to the remote control ID of the remote control device being operated is 1 as shown in FIG. 6, so a new screen ID 3 and the display screen information thereof is added as shown in FIG. 5. At this time, for the display screen information, the contents of the display screen information 1 shown above within the region 1, Tuner C receiving terrestrial broadcast channel 2 and displaying at a screen aspect ratio of 4:3, is determined, and the distance of the remote control device is still the same, whereby screen display processing is performed.

Figure 12:
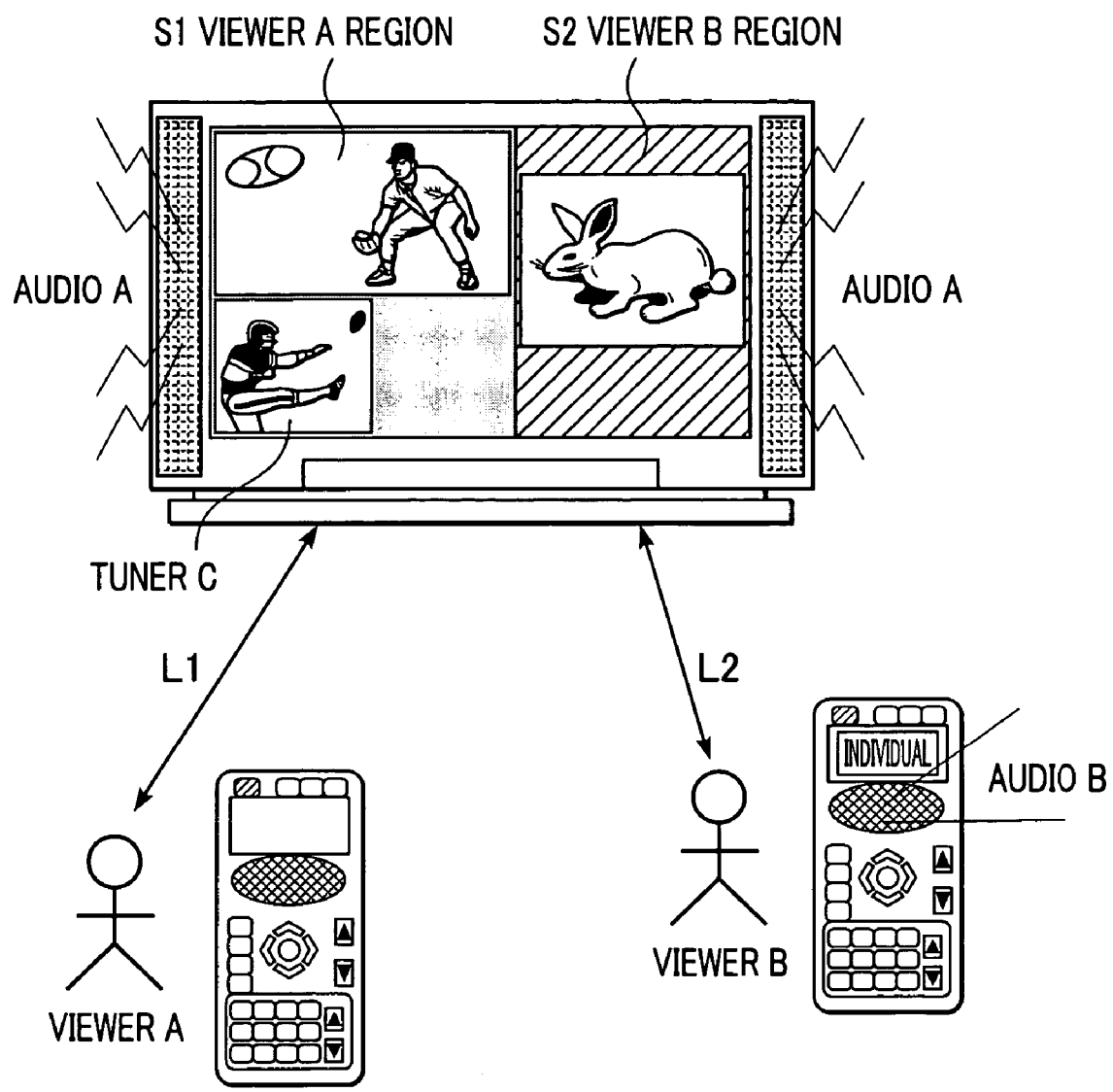
FIG. 12 is a diagram illustrating an example with the viewer A adding a screen.

In the screen processing shown in FIG. 21, a small screen of the Tuner C is additionally displayed within the region 1 as shown in FIG. 12, based on the screen display information of the screen ID3 that has been set. Next, let us say that the viewer A performs menu operations in the above state, so as to change the screen mode from two large/small screens to two equal sized screens. Accordingly, the key data and distance data is received based on the flow shown in FIGS. 18 and 24 in the same way as described above. For the screen mode changing operation processing, the distance data and the changed mode is written to the screen mode in the RDC table, and the screen display processing shown in FIG. 21 is activated.

Figure 13:
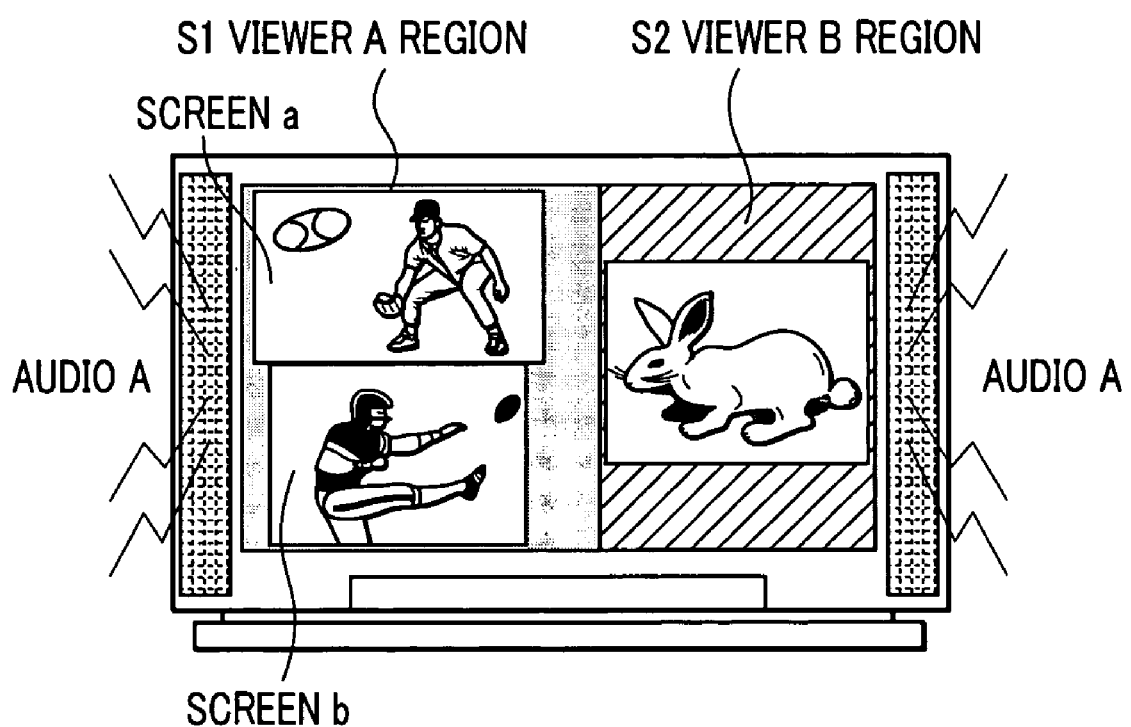
FIG. 13 is a diagram illustrating an example with the viewer A changing the screen size.

The screen display processing shown in FIG. 21 determines the size and position for the display screens of the screen ID1 and screen ID3 in the region 1, based on the changed screen mode for two equal sized screens, and makes a display such as shown in FIG. 13. Even though the screen mode has changed, the regions of each of the viewers A and B does not change, unless the distance of the viewers A and B changes.

Next, as a fourth operating example, a case will be described of the viewer A pressing the menu key of the first remote control device 1.2 in order to perform menu operations, or the viewer B pressing the menu key of the second remote control device 1.3 in order to perform menu operations. The display screen displayed by pressing the menu key is, as shown in FIGS. 14A through 14C, a screen consisting of several text phrases in frames which can be selected with the cursor keys, and can also be displayed on the remote control devices.

Figure 14A:
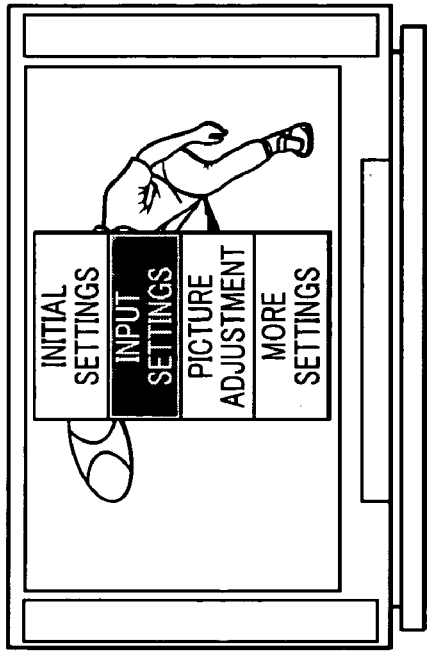
FIGS. 14A through 14C are diagrams illustrating a menu display example with the viewer A viewing alone.
Figure 14C:
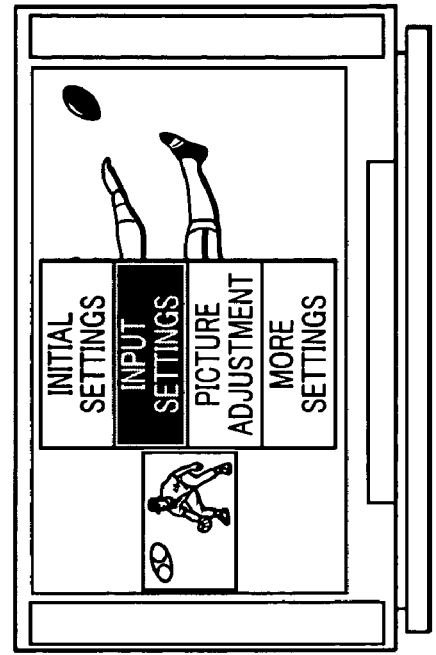
Figure 14B:
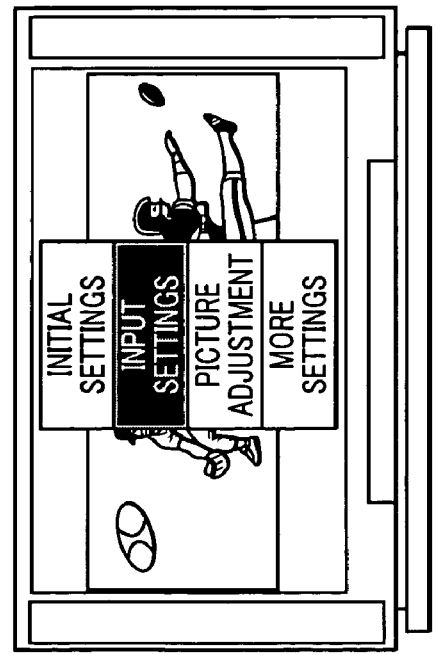
Figure 22:
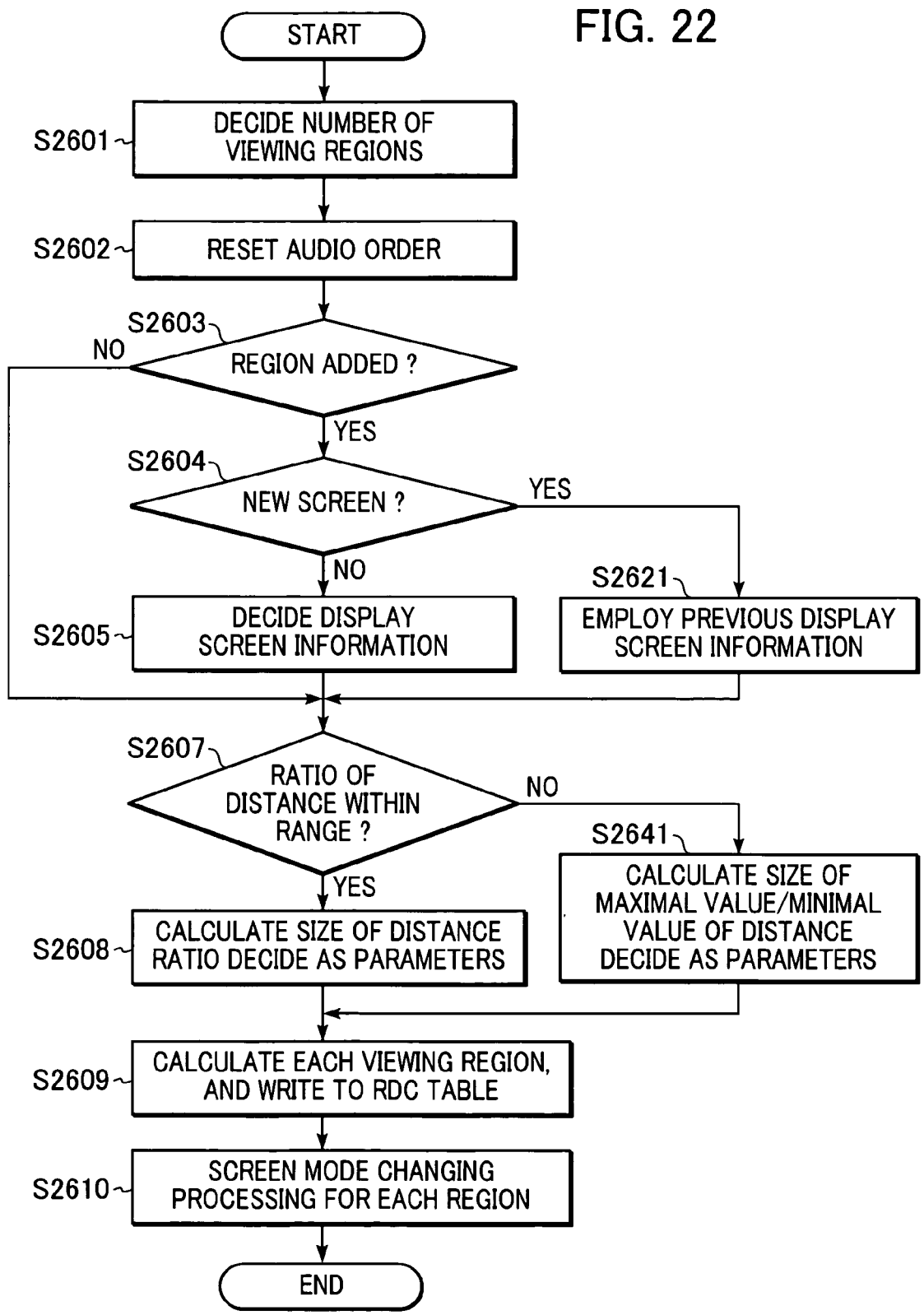
FIG. 22 is a diagram describing the flow of viewing region changing operations.

First, in a case wherein the viewer A is viewing alone on the entire screen by operating the first remote control device 1.2, in the event that the viewer A presses the menu key, the menu screen is displayed at the center with the default size and default position regardless of the screen mode following the flow in FIG. 22 as shown in FIGS. 14A through 14C, since the operating register is set and there is only one screen region set.

Figure 15:
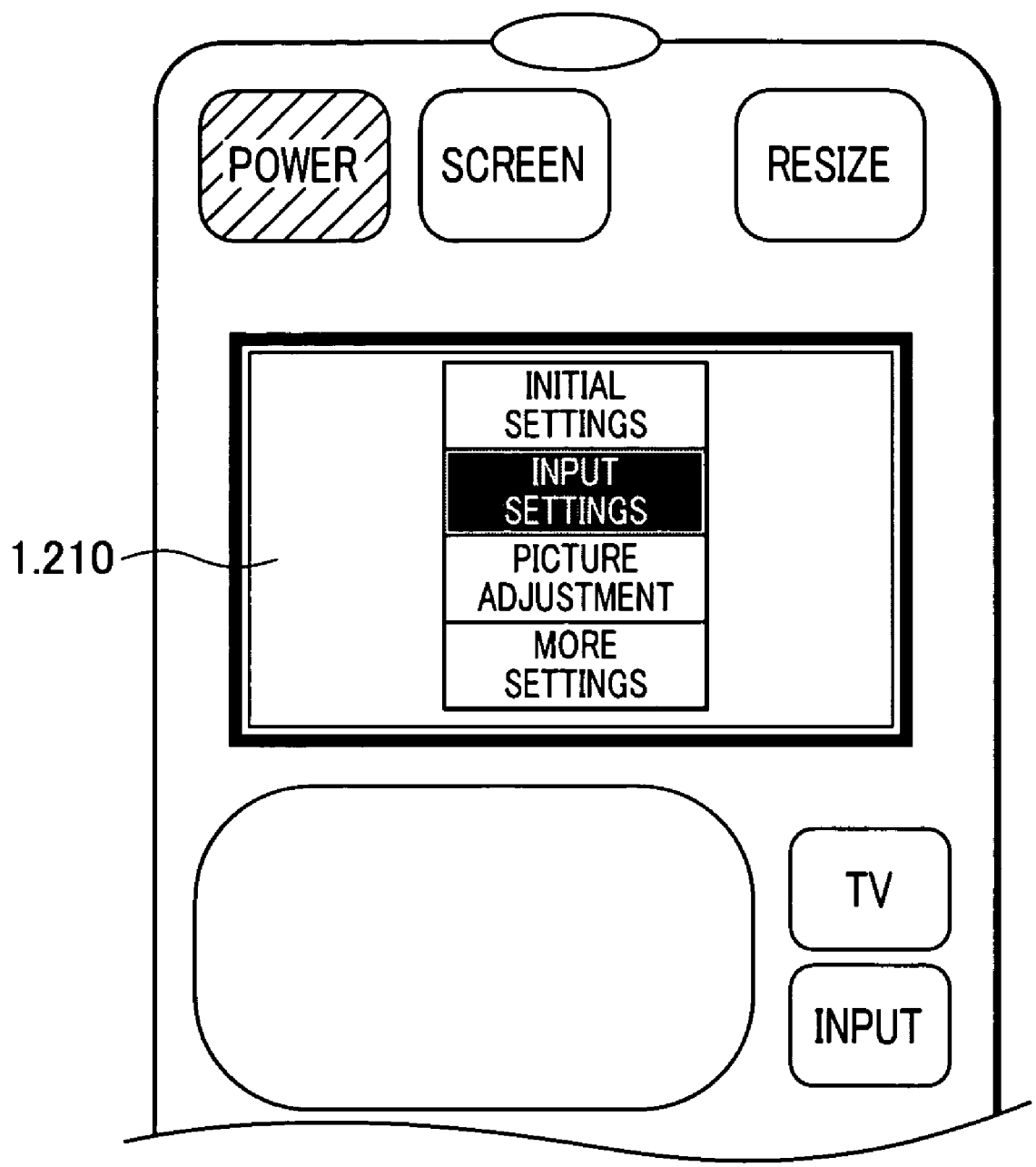
FIG. 15 is a diagram illustrating a menu display example with the viewer B not viewing.

Also, in the event that the viewer A is viewing alone on the entire screen and the viewer B presses the menu key of the second remote control device 1.3 in order to make menu operations without pressing the screen key, no operating register is set, so a reduced menu screen is displayed on the second remote control device 1.3 following the flow in FIG. 22 as shown in FIG. 15, since there is no screen region but the menu screen can be displayed on the remote control device.

Figure 16:
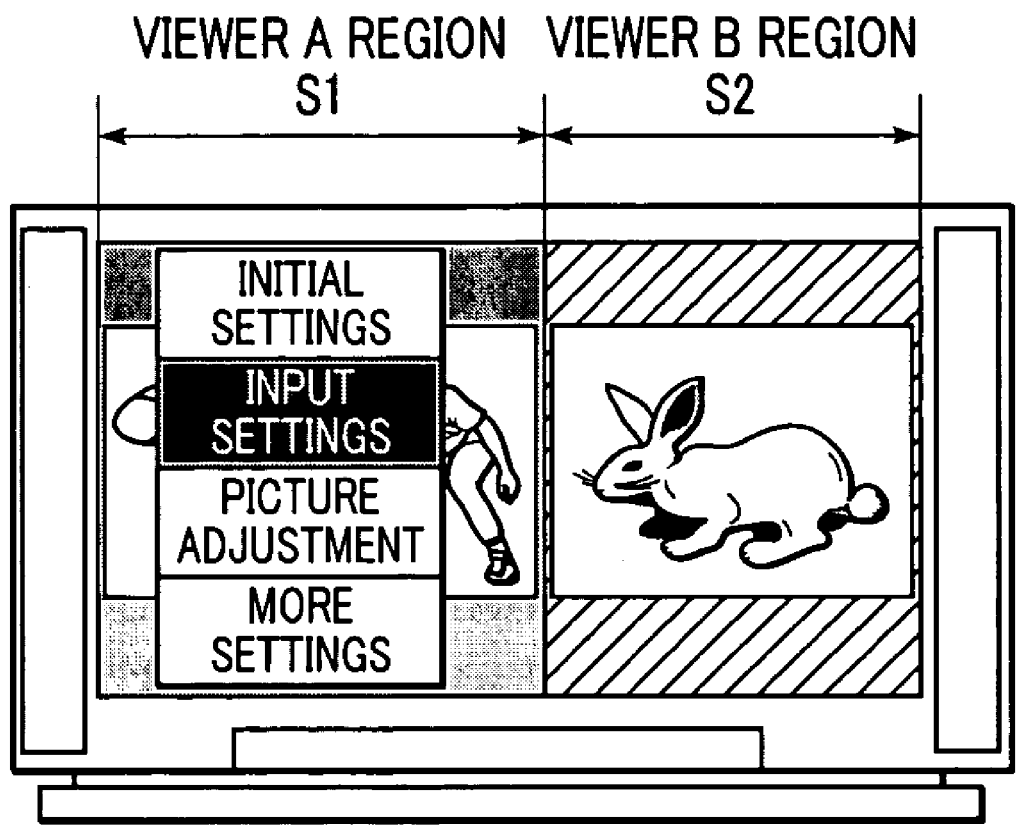
FIG. 16 is a diagram illustrating an example of a menu display for the viewer A with the viewers A and B viewing individually.

Also, in a case wherein the viewer A presses the menu key with the viewers A and B individually viewing as shown in FIG. 10, a display register is set and the screen region is not just one, so there is the need to avoid displaying the menu screen onto the screen region controlled by the second remote control device 1.3 operated by the viewer B. In the event that judgment is made here that the menu screen can be displayed in the region of the viewer A at the original size, the menu screen is displayed in the region of the viewer A with the default size but changed coordinates, following the flow in FIG. 22, as shown in FIG. 16.

Figure 17:
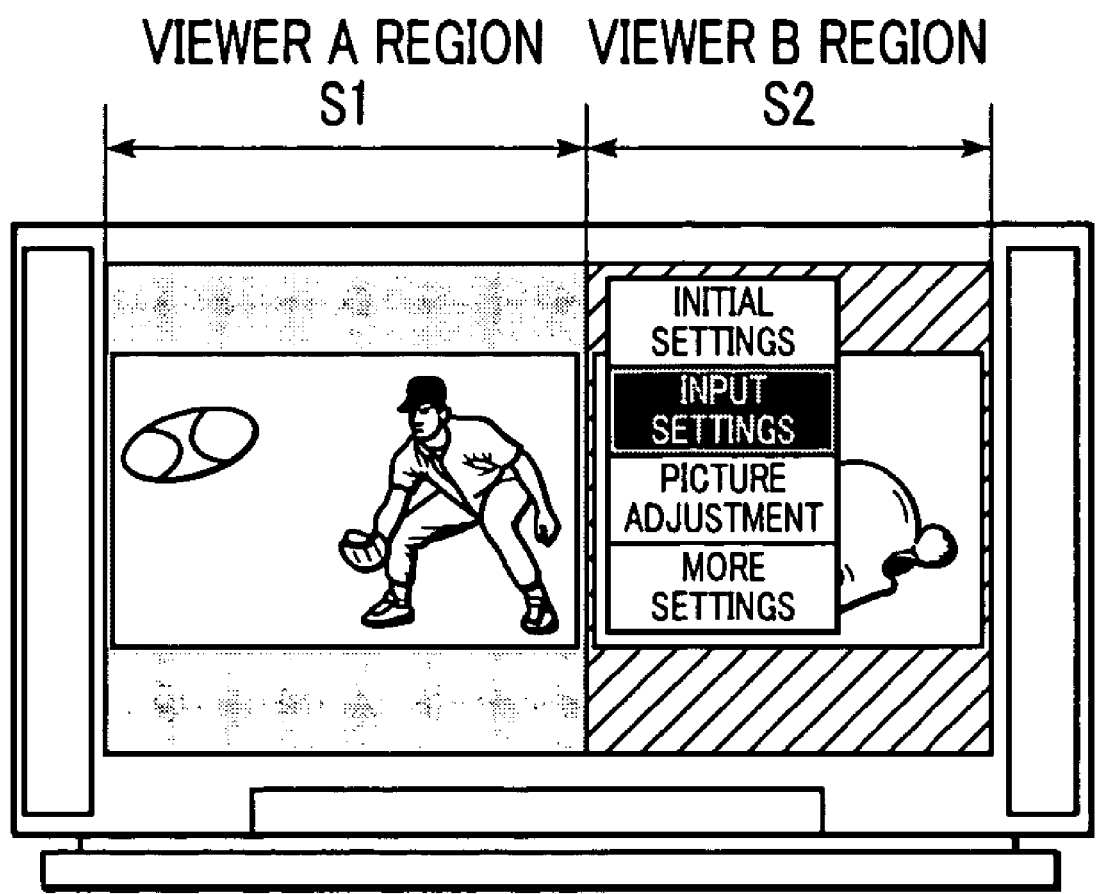
FIG. 17 is a diagram illustrating an example of a menu display for the viewer B with the viewers A and B viewing individually.

On the other hand, in a case wherein the viewer B presses the menu key in the above state, a display register is set and the screen region is not just one, so there is the need to avoid displaying the menu screen onto the screen region controlled by the first remote control device 1.2 operated by the viewer A. In the event that judgment is made here that the menu screen cannot be displayed in the region of the viewer B at the original size, the menu screen is displayed in the region of the viewer B with a reduced size and changed coordinates, following the flow in FIG. 22, as shown in FIG. 17.

Now, while the present embodiment has been described with regard to a menu screen, this holds for all types of display to be made as a result of viewer operations. Examples include an operating panel for a connected device, channel display, volume display, warning messages, icons, and so forth.

Also, with the present embodiment, a screen key has been provided for adding own screen regions (screen regions corresponding to the remote control device operated by the viewer) when starting individual viewing, and adding or deleting own screen regions when multiple screen regions thereof are displayed, but an arrangement may be made wherein a screen key is not provided, and instead the power key is assigned the functions of adding and deleting keys to the own screen area. Also, as mentioned above, in the event that control is not to be effected to enable display of multiple screens in the screen region, adding and deleting screen regions can be considered to be equal to adding and deleting screens.

In a configuration wherein the power key is assigned the functions of adding and deleting keys to the own screen area, the operations of the television device 1.1 in a case of the power key being pressed is shown in the flowchart in FIG. 25. Note that all steps other than S2220 and S2221 are the same as in FIG. 19, and accordingly, description thereof will be omitted.

In a case wherein the power key is pressed on the first remote control device 1.2 or the second remote control device 1.3, and there is no screen displayed corresponding to the remote control device of which the key has been pressed (i.e., an own screen region has not been set), and another screen (a screen controlled by remote control operations from another remote control device) is being displayed (S2201→S2202→S2211), in S2220 an operating register and viewing flag are set for the remote control ID of the remote control device of which the key was operated, and the viewing region changing process is activated (S2221). This sets a screen region controlled by the remote control device of which the power key was pressed, i.e., a screen to be controlled by this remote control device is displayed.

According to such control, in a case wherein there are no other screen regions to be controlled by other remote control devices displayed on the television set 1.1 (no other screen regions are set other than the screen region to be controlled by the remote control device of which the power key was pressed), the television set 1.1 performs power on/off operations in accordance with the pressing of the first remote control device 1.2 or the second remote control device 1.3, which is the normal function assigned thereto. On the other hand, in the event that one or more screen regions are displayed on the television set 1.1 other than the screen region controlled by the remote control device of which the power key was pressed (e.g., screen region controlled by other remote control devices) are set, pressing the power key on the first remote control device 1.2 or the second remote control device 1.3 performs adding/deleting of screen regions for the remote control device of which the key is operated.

In this way, changing assigning of functions for keys according to whether or not screen regions have been set other than the screen region controlled by the remote control device being operated, enables display control of screens corresponding to multiple remote control devices to be effected with a simple configuration.

It should be noted that the above-described example refers to an arrangement wherein multiple remote control devices are used as input devices, but input devices other than remote control devices can be used, such as operating buttons provided on the casing which houses the display control circuit (and display device). Also, the same control as described above with the first remote control device 1.2 is effective in cases wherein, instead of the second remote control device 1.3, the display system performs control so as to forcibly make a display not based on control by viewers.

Thus, according to the above-described embodiment, the screen size is determined according to the distance between multiple viewers and the television set, so a better individual screen viewing environment can be provided.

Also, setting the upper limit and lower limit of the screen with a maximum distance ratio value prevents the display screen size from becoming unrealistically small in the event that the remote control device is moved close to the television set.

Also, using the aspect ratio of the contents to be displayed at the time of determining the screen region and screen size allows a screen size to be decided which takes into consideration the aspect ratio of the screen as well.

Also, securing regions corresponding to the distance between multiple viewers and the television set and performing OSD and menu display only within the secured regions, provides an environment wherein the actions of one viewer do not interfere with the viewing of other viewers.

Also, not displaying menu screens on the television set that can be displayed on the remote control devices prevents interfering with the viewing of other viewers.

Further, providing higher priority of audio output from the television set for the viewer starting viewing at the earliest point prevents interfering with the viewing and listening of the viewer which started viewing first.

Moreover, turning the electric power source of the television set off with the power key is only available for the last viewer, so accidental turning off of the television set can be prevented, thereby providing an even better multi-viewing environment.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display control device for controlling a display device capable of displaying multiple screens on a display region, said display control device comprising:
   a display control circuit for controlling said display device according to commands input from multiple input devices
   wherein said display control circuit controls said display device so as to
      delete a screen region controlled by a predetermined input device which is one of said multiple input devices without turning an electric power source of said display device off in the event that a screen region to be controlled by another input device has been set, and
      turn the electric power source of the display device off in the event that a screen region to be controlled by another input device has not been set,
   in accordance with a predetermined command input from said predetermined input device.

2. A display system comprising:
   a display device capable of displaying a plurality of screens on a display region; and
   the display control device according to claim 1.

3. A TV device comprising:
   a display device for displaying multiple screens on a display region;
   a tuner for selecting a desired station to be displayed; and
   a display control device according to claim 1, for controlling the display device.

4. A display control device according to claim 1, wherein said input device or at least one of said multiple input devices is operated by a user of the display device.

5. A display control device according to claim 1, wherein said input device or at least one of said multiple input devices is a remote control device.

6. A display control device for controlling a display device capable of displaying multiple screens on a display region, said display control device comprising:
   a display control circuit for controlling the display device according to commands input from an input device;
   wherein said display control circuit controls the display device so as to
      delete a screen region controlled by said input device without turning an electric power source of said display device off in the event that a screen region other than the screen region to be controlled by said input device has been set, and
      turn the electric power source of said display device off in the event that a screen region to be controlled by another input device has not been set,
   in accordance with predetermined commands input from said input device.

7. A display control device according to claim 6, wherein the input device is operated by a user of the display device.

8. A display control device according to claim 6, wherein said input device is a remote control device.

9. A display control method for controlling a display device capable of displaying multiple screens on a display region, said method comprising the steps of:
   a step for accepting predetermined commands from a predetermined input device; and
   a step for
      deleting a screen region controlled by the predetermined input device which is one of a plurality of input devices without turning an electric power source of said display device off in the event that a screen region to be controlled by another input device has been set, and
      turning the electric power source of the display device off in the event that a screen region to be controlled by another input device has not been set,
   in accordance with the predetermined commands.

10. A display control method for controlling a display device capable of displaying multiple screens on a display region, said method comprising the steps of:
   a step for accepting predetermined commands from an input device; and
   a step for
      deleting a screen region controlled by the input device without turning an electric power source of the display device off in the event that a screen region other than the screen region to be controlled by the input device has been set; and
      turning the electric power source of the display device off in the event that a screen region to be controlled by another input device has not been set,
   in accordance with the predetermined commands.

11. A display system comprising:
   a display device capable of displaying a plurality of screens on a display region; and
   the display control device according to claim 6.

* * * * *

UNITED STATES PATENT AND TRADEMARK OFFICE
CERTIFICATE OF CORRECTION

| | | |
|---|---|---|
| PATENT NO. | : 7,394,450 B2 | Page 1 of 1 |
| APPLICATION NO. | : 10/812877 | |
| DATED | : July 1, 2008 | |
| INVENTOR(S) | : Yoshikazu Shibamiya et al. | |

It is certified that error appears in the above-identified patent and that said Letters Patent is hereby corrected as shown below:

SHEET 9:

FIG. 9, "AUDEO" should read --AUDIO--.

COLUMN 3:

Line 64, "other." should read --other--.

COLUMN 7:

Line 20, "leas" should read --least--.

COLUMN 12:

Line 46, "n" should read --In--.

COLUMN 23:

Line 13, "devices" should read --devices;--.

Signed and Sealed this

Twenty-first Day of April, 2009

JOHN DOLL
*Acting Director of the United States Patent and Trademark Office*